US008656081B2

(12) United States Patent
Irizarry

(10) Patent No.: US 8,656,081 B2
(45) Date of Patent: Feb. 18, 2014

(54) SYSTEM AND METHOD FOR COORDINATING CONTROL OF AN OUTPUT DEVICE BY MULTIPLE CONTROL CONSOLES

(75) Inventor: George Luis Irizarry, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 822 days.

(21) Appl. No.: 12/723,158

(22) Filed: Mar. 12, 2010

(65) Prior Publication Data

US 2011/0225531 A1    Sep. 15, 2011

(51) Int. Cl.
*G06F 13/00*    (2006.01)

(52) U.S. Cl.
USPC .......................................... 710/316; 710/241

(58) Field of Classification Search
USPC ........... 710/38, 110, 113, 305, 309, 316, 317, 710/240, 241
See application file for complete search history.

(56) References Cited

U.S. PATENT DOCUMENTS

| | | | | |
|---|---|---|---|---|
| 3,916,380 | A | * | 10/1975 | Fletcher et al. ............... 340/2.26 |
| 4,417,245 | A | * | 11/1983 | Melas et al. .................. 340/2.22 |
| 4,825,151 | A | | 4/1989 | Aspelin |
| 5,034,686 | A | | 7/1991 | Aspelin |
| 5,091,847 | A | | 2/1992 | Herbermann |
| 5,267,235 | A | * | 11/1993 | Thacker ......................... 370/396 |
| 5,276,728 | A | | 1/1994 | Pagliaroli et al. |
| 5,535,197 | A | * | 7/1996 | Cotton ...................... 370/395.72 |
| 5,949,015 | A | | 9/1999 | Smith et al. |
| 6,542,076 | B1 | | 4/2003 | Joao |
| 6,691,193 | B1 | * | 2/2004 | Wang et al. ................... 710/200 |
| 6,816,088 | B1 | | 11/2004 | Knoska et al. |
| 6,985,985 | B2 | * | 1/2006 | Moss ............................. 710/240 |
| 6,986,302 | B2 | | 1/2006 | LaFata |
| 7,020,161 | B1 | * | 3/2006 | Eberle et al. .................. 370/468 |
| 7,089,314 | B2 | * | 8/2006 | Tomikawa et al. ............ 709/229 |
| 7,092,867 | B2 | | 8/2006 | Huang et al. |
| 7,099,755 | B2 | | 8/2006 | Mueller et al. |
| 7,172,474 | B2 | | 2/2007 | Rzadki et al. |
| 7,228,261 | B2 | | 6/2007 | Leonard et al. |
| 7,266,632 | B2 | * | 9/2007 | Dao et al. ....................... 710/317 |
| 7,673,085 | B2 | * | 3/2010 | Kuo .............................. 710/110 |
| 8,125,109 | B2 | * | 2/2012 | Dold .............................. 307/326 |
| 2003/0058130 | A1 | | 3/2003 | Kramer et al. |
| 2003/0058602 | A1 | * | 3/2003 | Veil ............................... 361/166 |
| 2004/0007121 | A1 | | 1/2004 | Graves et al. |
| 2004/0103296 | A1 | | 5/2004 | Harp et al. |
| 2004/0112238 | A1 | | 6/2004 | Talbot |
| 2011/0202650 | A1 | * | 8/2011 | Abraham et al. ............. 709/224 |

OTHER PUBLICATIONS

Diode Switching Circuits, All About Circuits, <http://www.allaboutcircuits.com/vol_3/chpt_3/10.html#>, accessed on Aug. 28, 2012.*

* cited by examiner

*Primary Examiner* — Khanh Dang
(74) *Attorney, Agent, or Firm* — Christopher A. Monsey

(57) ABSTRACT

A system and method for interfacing multiple inputs and outputs in a control system is provided. A digital input/output system provides a localized interface between multiple operator consoles and at least one output device to coordinate and monitor the operation of the at least one output device. The digital input/output system includes an interface device which re-routes discrete lines to and from the operator consoles and output devices and eliminates conflicting signals sent from the operator consoles to the output devices.

28 Claims, 19 Drawing Sheets

SYSTEM AND METHOD FOR COORDINATING CONTROL OF AN OUTPUT DEVICE BY MULTIPLE CONTROL CONSOLES

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

CROSS-REFERENCE TO RELATED APPLICATION

This application is related to co-pending patent application Ser. No. 12/723,140 entitled "Interface Device for Coordinating Control of an Output Device by Multiple Control Consoles", filed on Mar. 12, 2010, the disclosure of which is expressly incorporated by reference herein.

BACKGROUND AND SUMMARY

The present disclosure relates generally to a system and method for coordinating or interfacing multiple input devices with at least one output device. More particularly, the present disclosure relates to an input/output system which provides a localized interface between multiple operator control consoles and at least one output device to coordinate and monitor the operation of the at least one output device.

In some control systems, multiple operator consoles are used to control and monitor one or more output devices. In such a system, each operator console may be configured to transmit control signals to the output devices at any given time. As a result, conflicting control signals from the operator consoles may be received by the output devices, resulting in an unwanted response by an output device or a fault state by the control system. In addition, troubleshooting such control systems may be difficult if the nodes on the control system, including the operator consoles and the output devices, are physically remote from each other.

According to one illustrated embodiment of the present disclosure, a system for coordinating control of an output device by a plurality of different operators comprises a first control console having at least one device selection input to select at least one output device for control by the first control console and at least one device control input to control operation of at least one selected output device from the first control console, and a second control console spaced apart from the first control console. The second control console also has at least one device selection input to select at least one output device for control by the second control console and at least one device control input to control operation of at least one selected output device from the second control console. The system also includes an input/output control system coupled to the first and second control consoles and to the at least one output device. The input/output control system is configured to receive signals from the device selection inputs and the device control inputs of the first and second control consoles. In response to receipt of a device selection input signal for a selected output device from the first control console before receipt of a device selection input signal corresponding to the same selected device from the second control console, the input/output control system enables a device control input of the first control console corresponding to the selected device and disables the device selection input of the second control console corresponding to the selected device. In response to receipt of a device selection input signal for the selected output device from the second control console before receipt of a device selection input corresponding to the same selected device from the first control console, the input/output control system enables a device control input of the second control console corresponding to the selected device and disables the device selection input of the first control console corresponding to the selected device.

In one illustrated embodiment, the device control inputs of the first and second control consoles include a first control input to activate the selected output device from the first and second control consoles and a second control input to control operation of the activated selected output device from the first and second control consoles. In one illustrated embodiment, the input/output control system is configured to automatically send an activation signal from the input/output system to the selected output device in response to receipt of a signal from a first control input, thereby permitting control of the activated output device by a corresponding second control input. In another illustrated embodiment, the input/output control system is configured to receive signals from the first and second control inputs of the first and second control consoles, the input/output control system being configured to transmit signals to the selected output device to activate and control the selected output device in response to the signals from the first and second control inputs, respectively.

In one illustrated embodiment, the first and second control consoles each include a display to monitor operation of the at least one output device. In another illustrated embodiment, in response to receipt of a device selection input signal for a selected output device from the first control console before receipt of a device selection input signal corresponding to the same selected device from the second control console, the input/output control system enables monitoring of the selected device on the display of the first control console and disables monitoring of the selected device on the display of the second control console. In response to receipt of a device selection input signal for the selected output device from the second control console before receipt of a device selection input corresponding to the same selected device from the first control console, the input/output control system enables monitoring of the selected device on the display of the second control console and disables monitoring of the selected device on the display of the first control console.

According to another illustrated embodiment of the present disclosure, a method for coordinating control of an output device by a plurality of different operators comprises providing a first control console having at least one device selection input to select at least one output device for control by the first control console and at least one device control input to control operation of at least one selected output device from the first control console, and providing a second control console spaced apart from the first control console. The second control console also has at least one device selection input to select at least one output device for control by the second control console and at least one device control input to control operation of at least one selected output device from the second control console. The method further comprises enabling a device control input of the first control console corresponding to a selected device and disabling the device selection input of the second control console corresponding to the selected device in response to receipt of a device selection input signal for the selected output device from the first control console before receipt of a device selection input signal corresponding to the same selected device from the second control console, and enabling a device control input of the second control console corresponding to the selected device and disabling the device selection input corresponding to the selected device on the first control console in response to receipt of a device selection input signal for the selected output device from the second control console before receipt of a device selection input corresponding to the same selected device from the first control console.

According to another illustrated embodiment of the present disclosure, a system for coordinating control of an output device by a plurality of different operators comprises a first control console having at least one device selection input to select at least one output device for control by the first control console and at least one device control input to control operation of at least one selected output device from the first control console. A second control console spaced apart from the first control console also has at least one device selection input to select at least one output device for control by the second control console and at least one device control input to control operation of at least one selected output device from the second control console. The system further includes a means coupled to the first and second control consoles and to the at least one output device for receiving signals from the device selection inputs and the device control inputs of the first and second control consoles. The system further includes a means for enabling a device control input of the first control console corresponding to the selected device and for disabling the device selection input of the second control console corresponding to the selected device in response to receipt of a device selection input signal for a selected output device from the first control console before receipt of a device selection input signal corresponding to the same selected device from the second control console. The system further includes a means for enabling a device control input of the second control console corresponding to the selected device and for disabling the device selection input of the first control console corresponding to the selected device in response to receipt of a device selection input signal for the selected output device from the second control console before receipt of a device selection input corresponding to the same selected device from the first control console.

According to one illustrated embodiment of the present disclosure, an interface device is configured to coordinate control of at least one output device by a control system including first and second control consoles. The interface device comprises a circuit board having a plurality of conductive pathways, and first and second connectors coupled to the circuit board. The first and second connectors each include a plurality of pins coupled to selected conductive pathways of the circuit board to provide a communication link to the first and second control consoles, respectively. The interface device also includes a third connector coupled to the circuit board and a plurality of switches mounted to the circuit board. The third connector includes a plurality of pins coupled to selected conductive pathways of the circuit board to provide a communication link to the output device, and each switch is coupled to at least one conductive pathway of the circuit board to electrically couple the switches to at least one of the first, second and third connectors. The first and second connectors receive signals from at least one device selection input and at least one device control input of the first and second control consoles, respectively. In response to receipt of a device selection input signal for a selected output device from the first control console before receipt of a device selection input signal corresponding to the same selected output device from the second control console, at least one of the plurality of switches enables the at least one device control input of the first control console corresponding to the selected device. In response to receipt of a device selection input signal for the selected output device from the second control console before receipt of a device selection input corresponding to the same selected output device from the first control console, at least one of the plurality of switches enables the at least one device control input of the second control console corresponding to the selected device.

In an illustrated embodiment, the control system further includes a communication network and an output module coupled to the communication network and configured to receive network signals from the first and second control consoles over the communication network. The interface device further includes a fourth connector coupled to the circuit board. The fourth connector includes a plurality of pins coupled to selected conductive pathways of the circuit board to provide a communication link to the output module. The output module transmits the device selection input signals for a selected output device received from the first and second control consoles to the fourth connector to trigger the at least one switch to enable the respective device control input.

According to one illustrated embodiment of the present disclosure, an interface device is configured to coordinate control of at least one an output device by a control system including first and second control consoles. The interface device comprises a circuit board having a plurality of conductive pathways, and first and second connectors coupled to the circuit board. The first and second connectors each include a plurality of pins coupled to selected conductive pathways of the circuit board to provide a communication link to the first and second control consoles, respectively. The interface device also includes a third connector coupled to the circuit board, and a plurality of switches mounted to the circuit board. The third connector includes a plurality of pins coupled to selected conductive pathways of the circuit board to provide a communication link to the output device. Each switch is coupled to at least one conductive pathway of the circuit board to electrically couple the switches to at least one of the first, second and third connectors. The first and second connectors receive first control signals from inputs of the first and second control consoles to activate a selected output device and second control signals from inputs of the first and second control consoles to control operation of the activated selected output device. At least one of the switches coupled to the third connector is configured to automatically send an activation signal to the selected output device in response to receipt of a first control signal, thereby permitting control of the activated output device by a second control signal also sent through the third connector to the selected output device.

According to yet another illustrated embodiment of the present disclosure, a method of coordinating control of at least one output device by a control system including first and second control consoles includes providing an interface device comprising a circuit board having a plurality of conductive pathways, first, second and third connectors coupled to the circuit board, the first, second and third connectors each including a plurality of pins coupled to selected conductive pathways of the circuit board, and a plurality of switches coupled to the circuit board, each switch being coupled to at least one conductive pathway of the circuit board to electrically couple the switches to at least one of the first, second and third connectors. In one illustrated embodiment, the method also includes using the interface device to coordinate control of the at least one an output device by the first and second control consoles by: electrically coupling the first and second connectors to the first and second control consoles, respectively, to provide a communication link between the interface device and the first and second control consoles; electrically coupling the output device to the third connector to provide a communication link between the interface device and the output device; using at least one of the plurality of switches to enable at least one device control input of the first control console corresponding to a selected output device in response to receipt of a device selection input signal for the selected output device from the first control console before receipt of a device selection input signal corresponding to the same selected output device from the second control console; and using at least one other of the plurality of switches to enable at least one device control input of the second control console corresponding to a selected output device in response to receipt of a device selection input signal for the selected output device from the second control console before receipt of a device selection input signal corresponding to the same selected output device from the first control console.

In another illustrated embodiment, the method includes using the interface device to coordinate control of the at least one an output device by the first and second control consoles by: electrically coupling the first and second connectors to the first and second control consoles, respectively, to provide a communication link between the interface device and the first and second control consoles so that the first and second connectors receive first control signals from inputs of the first and second control consoles to activate a selected output device and a second control signals from inputs of the first and second control consoles to control operation of the activated selected output device; electrically coupling the output device to the third connector to provide a communication link between the interface device and the output device; using at least one of the switches coupled to the third connector to automatically send an activation signal to the selected output device in response to receipt of a first control signal; and controlling the activated output device with a second control signal also sent through the third connector to the selected output device.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
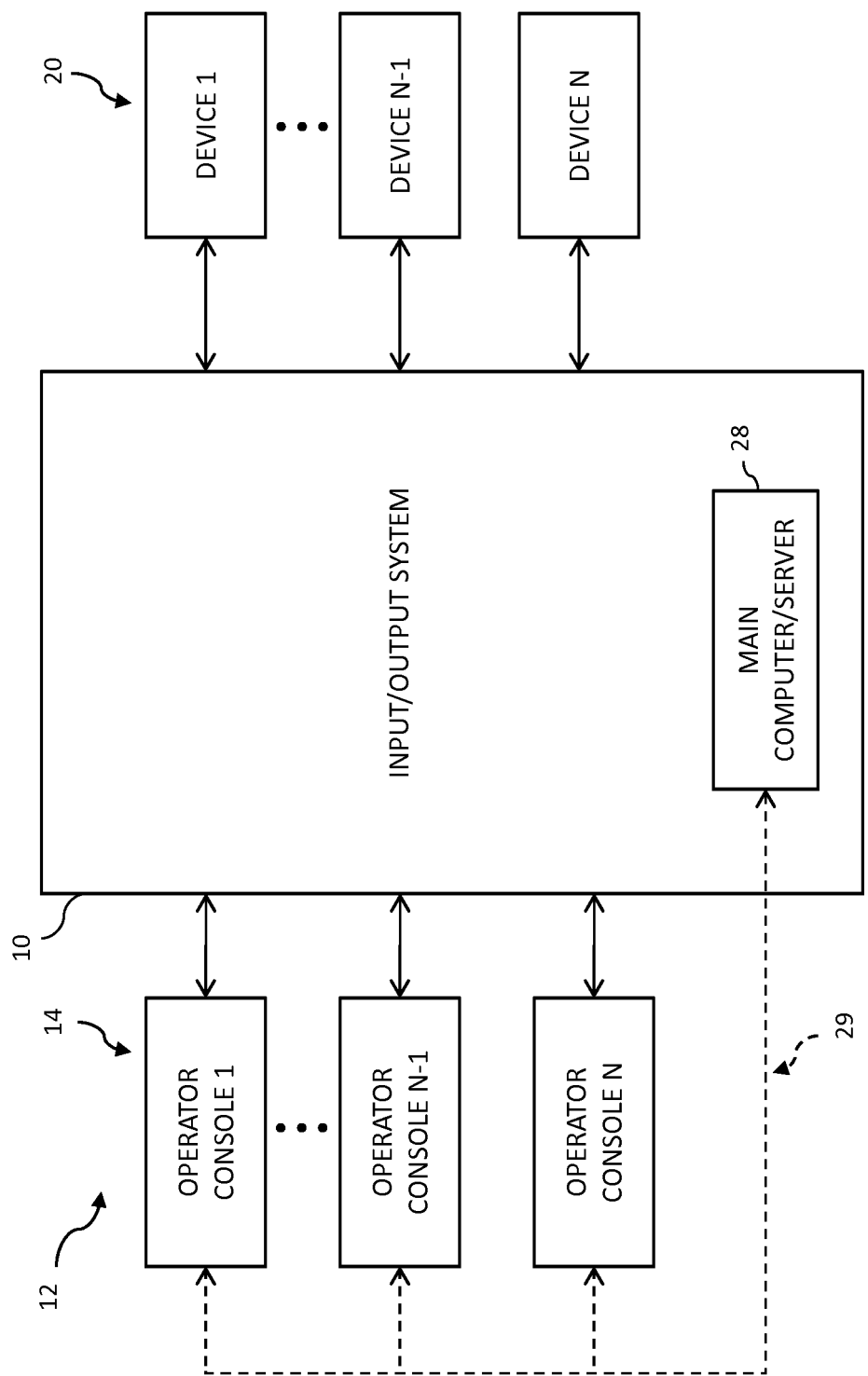
FIG. 1 is a block diagram illustrating a control system of the present disclosure wherein an input/output system coordinates communication between a plurality of operator control consoles and at least one output device.

Corresponding reference characters indicate corresponding parts throughout the several views. Although the drawings represent embodiments of various features and components in the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, a control system 12 including an input/output system 10 of the present disclosure is shown. Control system 12 may be implemented in a variety of applications, including a vehicle, a manufacturing facility to control industrial equipment, military applications, or any other suitable application. In one illustrated embodiment, control system 12 is implemented as a protection system on a vessel or ship for conducting surveillance and evaluating and responding to identified threats to the vessel. One exemplary protection system that may utilize control system 12 is described in U.S. Pat. No. 6,903,676, which is expressly incorporated by reference herein.

Control system 12 illustratively includes a plurality of operator control consoles 14 and a plurality of devices 20 in communication with input/output system 10. Control system 12 illustratively includes at least two operator consoles 14 and at least one device 20. Input/output system 10 illustratively interfaces each operator console 14 and each device 20 to coordinate, monitor, and manage communication therebetween. In one embodiment, consoles 14 and devices 20 are hard-wired to input/output system 10, although wireless communication may alternatively be used. A user interface 150 (see FIG. 2), including an interactive graphical display 168 (see FIG. 8), is illustratively provided at each operator console 14. The user interface 150 receives user inputs and allows operators to manipulate and monitor devices 20. In one embodiment, user interface 150 of each operator console 14 includes a touchscreen, although a keypad, mouse, touchpad, trackball, keyboard, or any other suitable input device may also be used. User interface 150 also may include one or more of the following: an information display, a video display providing video from a video input source, and a hand controller. Devices 20 may be any suitable output or controllable devices or may be subsystems of control system 12.

Input/output system 10 includes a main computer or server 28 communicatively coupled to operator consoles 14. In one embodiment, input/output system 10 is a digital input/output system. Communication between nodes on control system 12 may be monitored at a remote location via server 28. In the illustrated embodiment, operator consoles 14 communicate with server 28 over a communication network 29, illustratively a local area network such as Ethernet. In one embodiment, devices 20 may also communicate directly with server 28 over communication network 29. In one embodiment, devices 20 may also communicate with operator consoles 14 via serial communication, such as for transmitting feedback signals to operator consoles 14 for monitoring purposes.

Figure 2:
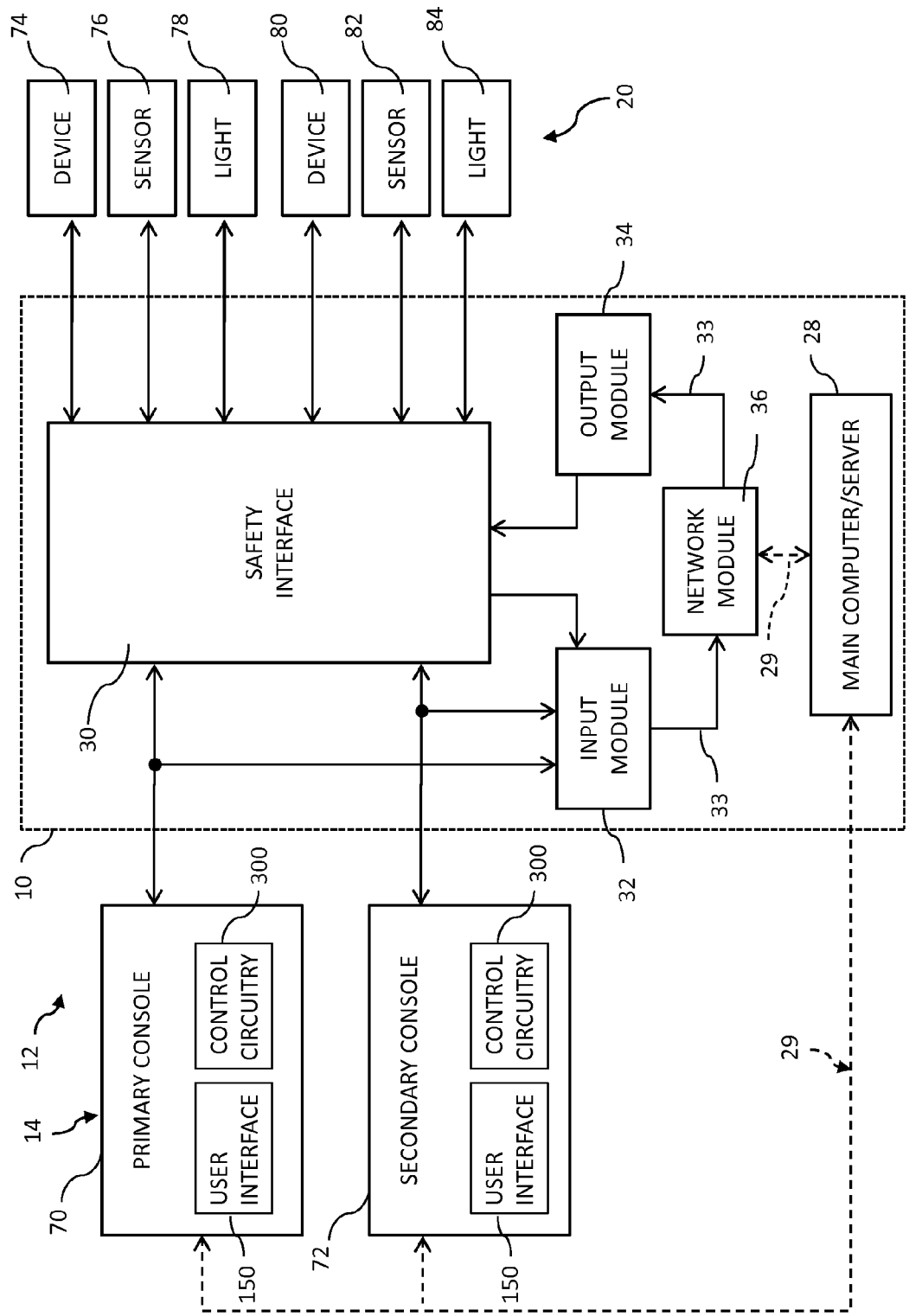
FIG. 2 is a block diagram illustrating one embodiment of the control system of FIG. 1 wherein a digital input/output system includes a safety interface, an input module, an output module, and a network module.

Referring to FIG. 2, an illustrated embodiment of control system 12 is shown. In FIG. 2 and as described herein, devices 20 of FIG. 1 may illustratively include devices 74 and 80, sensors 76 and 82, and lights 78 and 84 (collectively output devices 20). A primary console 70 and a secondary console 72 illustratively correspond to operator consoles 14 of FIG. 1. While two operator consoles 70 and 72 are described herein, any desired number of operator consoles may be used. Devices 74 and 80 are illustratively any output or control devices configured to be controlled and/or monitored by primary and secondary consoles 70 and 72. In one embodiment, lights 78 and 84 are each mounted to a light holding apparatus, such as a gimbal mechanism (not shown). Sensors 76 and 82 are any sensors or transducers configured to provide feedback to the operator consoles 70, 72. In one embodiment, sensors 76 and 82 are electro-optical sensors configured to provide detection, surveillance, and/or tracking capabilities. In one illustrated embodiment, sensors 76 and 82 each include a video camera providing video and/or data feedback to consoles 70 and 72. In another embodiment, each sensor 76 and 82 comprises a plurality of cameras, including infrared or thermal, laser, and/or standard video cameras, mounted on a turret unit and configured to provide multiple camera feedback signals for display on consoles 70 and 72. While six output devices 20 are shown in FIG. 2 and described herein for illustrative purposes, any desired number of output devices 20 may be used.

Primary console 70 and secondary console 72 each include a user interface 150 configured to provide controls and monitoring capability for each output device 20. Primary and secondary consoles 70 and 72 also illustratively each include control circuitry 300 for controlling devices 74 and 80. In one embodiment, control circuitry 300 includes a plurality of switches which, upon engagement by a user, transmit control signals to devices 74 and 80. In the illustrated embodiment, primary and secondary consoles 70 and 72 have identical controls and functionality but are physically remote from each other, for example in different or remote areas of the control system environment. Alternatively, consoles 70 and 72 may be located near each other in the control system environment.

In the illustrative embodiment of FIG. 2, input/output system 10 of FIG. 1 is a digital input/output (DIO) system 10. The controls communicated by user interface 150 and control circuitry 300 at consoles 70, 72 are coordinated, monitored, and managed by DIO system 10. In particular, DIO system 10 coordinates assigning and enabling control of output devices 20 to consoles 70, 72. In addition, DIO system 10 coordinates the activation of output devices 20 by consoles 70, 72 and reduces the likelihood of the receipt of conflicting commands by devices 20 and/or consoles 70, 72.

Referring still to FIG. 2, DIO system 10 includes an interface circuit or safety interface 30, an input module 32, an output module 34, and a network module 36. Network module 36 is illustratively an Ethernet module, shown in FIGS. 3 and 4, configured to communicate signals to and from server 28 over communication network 29, although other suitable network modules providing other communication protocols may be used. An exemplary Ethernet network module 36 is a National Instruments cFP-1804 module. Input and output modules 32 and 34 communicate with network module 36 over a communication bus 33. Exemplary input and output modules 32 and 34 are National Instruments cFP-DI-304 and National Instruments cFP-DO-401, respectively, although other suitable input/output modules may be used. Input and output modules 32 and 34 each include a power supply, such as power supply 120 of output module 34 illustrated in FIGS. 6 and 7. An exemplary power supply is a National Instruments PS-2 24 VDC power supply.

Input module 32 and output module 34 are configured to communicate with various nodes in control system 12. Input and output modules 32, 34 are illustratively digital modules for communicating digital signals, but may alternatively be analog modules. In the illustrated embodiment, input module 32 is configured to receive digital signals from primary and secondary consoles 70, 72 and safety interface 30 and, in response, communicate corresponding Ethernet signals to server 28 via network module 36. Similarly, output module 34 is configured to receive Ethernet signals transmitted from consoles 70, 72 and through server 28 over communication network 29 and, in response, to transmit corresponding digital signals to safety interface 30. Although not shown in FIG. 2, output devices 20 may also communicate directly with input and output modules 32, 34. In one embodiment, consoles 70, 72 are hardwired to input module 32, and safety interface 30 is hardwired to both input module 32 and output module 34, although wireless communication may alternatively be used.

Figure 3:
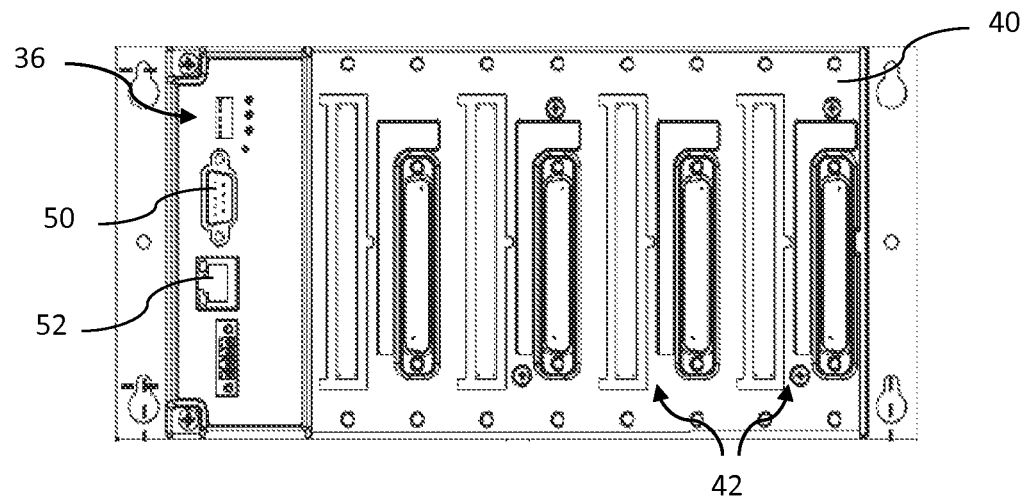
FIGS. 3 and 4 illustrate an exemplary network module of the digital input/output system of FIG. 2.
Figure 4:
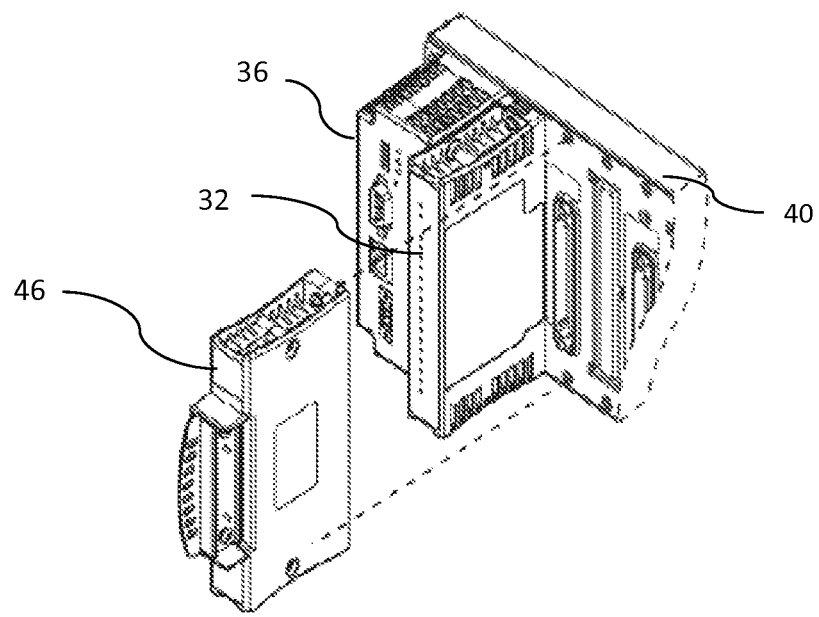

Referring to FIGS. 3 and 4, an exemplary network module 36 illustratively includes an Ethernet port 52 configured to connect input and output modules 32, 34 to server 28 for communication over communication network 29. Using network module 36 as a communication interface, server 28 receives signals or data from input module 32 and transmits signals or data to output module 34. A backplane 40 includes a plurality of banks 42 having at least one slot for receiving input and output modules 32 and 34 and their corresponding terminal connector blocks, such as connector block 46. The connector blocks include a plurality of terminals configured to receive signal-carrying wires routed from consoles 70, 72 and safety interface 30. Network module 36 illustratively further includes a serial port 50 for serial communication with various nodes in control system 12.

Safety interface 30 of FIG. 2 is configured to coordinate and manage communication between consoles 70, 72 and output devices 20 and to transmit status signals to input module 32 for remote monitoring over communication network 29. As shown in FIG. 2, safety interface 30 is illustratively an input and output interface communicatively coupled to input module 32, output module 34, and each of consoles 70, 72 and output devices 20. Safety interface 30 may be a microprocessor, a circuit board, a software program, or any other suitable interface. In the illustrated embodiment described herein, however, safety interface 30 is a circuit board including a plurality of switches and connectors which provides a single, localized interface for nodes in control system 12. As such, safety interface 30 is configured to provide a centralized location for troubleshooting communication between nodes on control system 12.

Safety interface 30 is configured to selectively re-route discrete lines or signals to and from various nodes in control system 12. In particular, safety interface 30 selectively re-routes discrete lines from consoles 70, 72 to output devices 20, to input module 32, and back to consoles 70, 72. Safety interface 30 also selectively re-routes discrete lines from output devices 20 to consoles 70, 72, to input module 32, and back to output devices 20. Safety interface 30 also selectively re-routes discrete lines or signals from output module 34 to output devices 20 and to consoles 70, 72.

Figure 5:
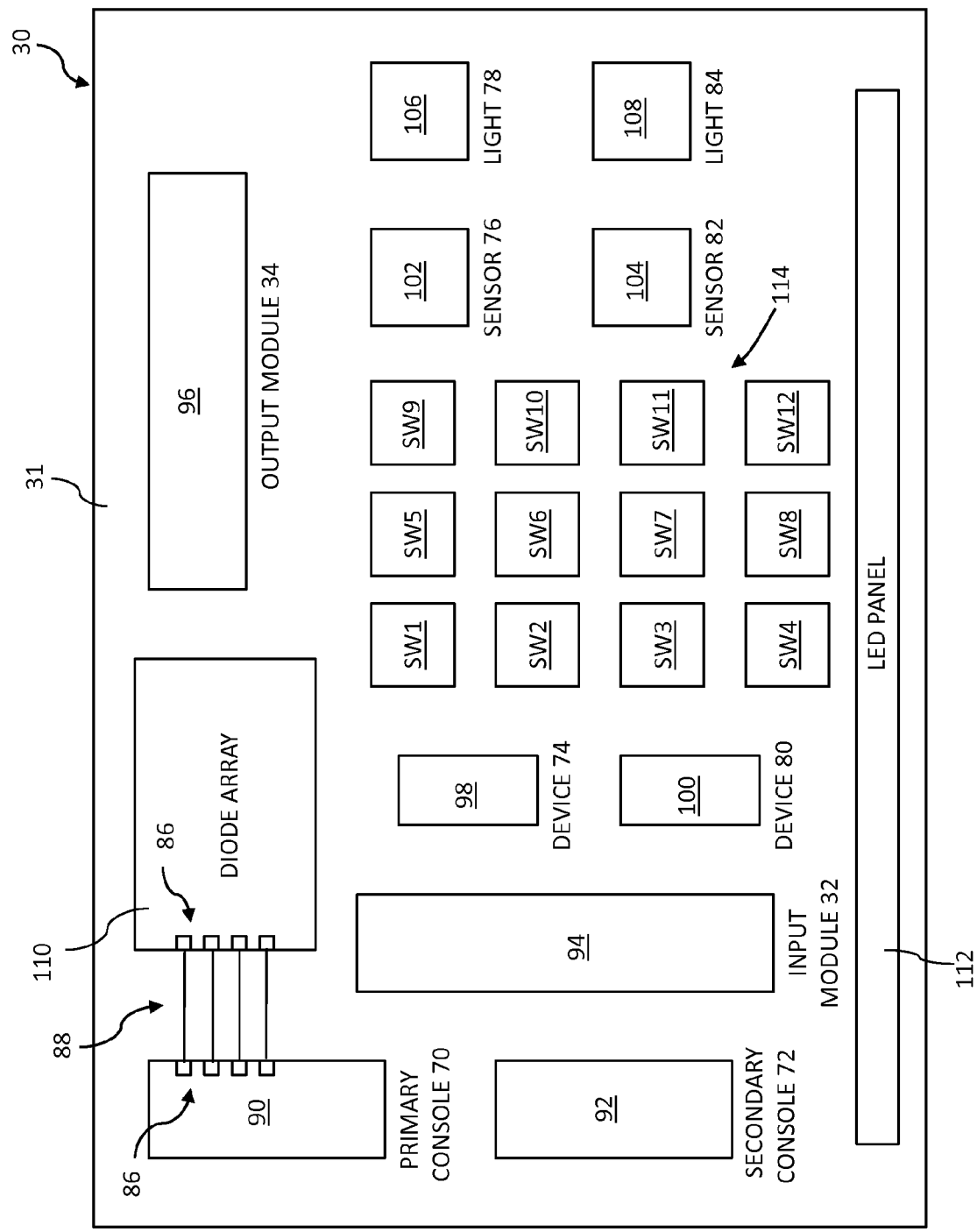
FIG. 5 is a block diagram illustrating one embodiment of the safety interface of FIG. 2.

FIG. 5 shows an exemplary embodiment of safety interface 30 of FIG. 2. Safety interface 30 of the illustrated embodiment comprises a plurality of components mounted to a printed circuit board (PCB) 31, illustratively including a plurality of switches 114, a diode array 110, a light-emitting diode (LED) panel 112, and electrical connectors or headers 90-108. The electrical connectors 90-108 are configured to receive signal-carrying wires from at least one of primary console 70, secondary console 72, input modules 32, output module 34, and output devices 20 to provide a communication link therebetween. In one embodiment, a conventional wire harness (not shown) couples the wires to each of connectors 90-108. In one embodiment, electrical connectors 90-108 include conductive pins 86 configured to electrically communicate with the received wires. The conductive pins 86 are mounted to circuit board 31 and are coupled to conductive pathways or traces, illustratively traces 88, on circuit board 31 that are routed to other components on circuit board 31. As such, signals transmitted over the wires to electrical connectors 90-108 are routed by safety interface 30 to other components on the card, such as to diode array 110, switches 114, and LED panel 112, or to other electrical connectors 90-108 for transmission to nodes on control system 12. For the sake of clarity, only several traces 88 and several conductive pins 86 are illustrated in FIG. 5. However, each connector 90-108 includes conductive pins 86 that are coupled to traces 88 on circuit board 31.

In the illustrated embodiment, circuit board 31 of safety interface 30 is a conventional printed circuit board including a plurality of conductive pathways or traces 88 routed between connectors 90-108, diode array 110, switches 114, and LED panel 112. The conductive traces 88 are etched into a non-conductive substrate to facilitate communication between connectors 90-108, diode array 110, switches 114, and LED panel 112. The printed circuit board 31 of safety interface 30 may include any suitable number of layers to support the plurality of traces 88.

In the illustrated embodiment, connector 90 is configured to receive a wire harness comprising a plurality of wires from primary console 70 to electrically connect and provide a communication link between primary console 70 and safety interface 30. Similarly, connector 92 is configured to receive a wire harness from secondary console 72, connector 94 from input module 32, connector 96 from output module 34, connector 98 from device 74, connector 100 from device 80, connector 102 from sensor 76, connector 104 from sensor 82, connector 106 from light 78, and connector 108 from light 84.

Figure 16:
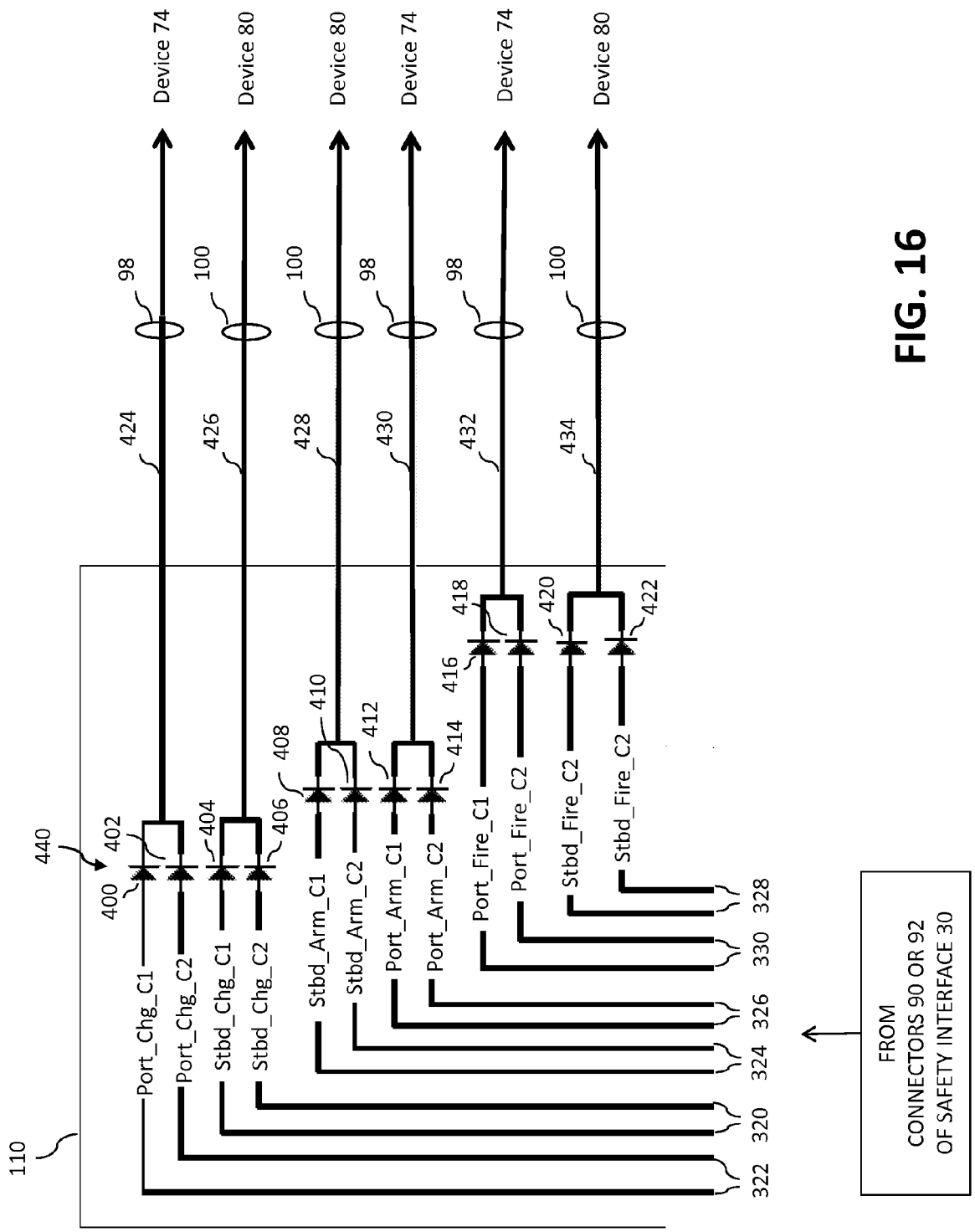
FIG. 16 illustrates an exemplary diode array of the safety interface of FIG. 5.

Diode array 110 of FIG. 5 is configured to link control signals transmitted from consoles 70 and 72 to output devices 20. An exemplary diode array 110 is illustrated in FIG. 16. In one embodiment, diode array 110 reduces the likelihood that a control signal transmitted from one of consoles 70, 72 and received by one of output devices 20 is also received by the other of consoles 70, 72. For example, a discrete line configured to carry a control signal is routed from each of consoles 70, 72 to diode array 110. Diode array 110 merges the two discrete lines from consoles 70, 72 into a single discrete line routed to an output device 20. By using a dual switching, common cathode diode arrangement, as shown in the illustrative embodiment of FIG. 16, the likelihood that control signals transmitted from one of consoles 70, 72 are received by the other of consoles 70, 72 is reduced or eliminated, thereby reducing the likelihood of improper feedback at consoles 70, 72.

Still referring to FIG. 5, LED panel 112 of safety interface 30 provides a status indication of the receipt of various signals from nodes on control system 12. LED panel 112 is configured to assist in troubleshooting at safety interface 30 and, for example, to verify that control signals from consoles 70, 72 are received by safety interface 30. In the illustrated embodiment, an appropriate LED on LED panel 112 illuminates upon receipt of a signal transmitted from one of the consoles 70 and 72. Any number and color of LED's may be used, and each LED may provide a different status indication.

Safety interface 30 further includes a plurality of switches 114, as shown in FIG. 5. Any desired number of switches 114 may be used, although twelve switches (SW1-SW12) are illustrated in FIG. 5. Switches 114 are illustratively relays in electrical communication with at least one of connectors 90-108, although any suitable switching device may be used. As explained herein, each switch 114 is configured to receive a signal from a device, module, or console of control system 12 and, upon a triggering event, transmit the signal to a same or different device, module, or console. In the illustrated embodiment, the triggering event is an output signal transmitted from output module 34 to each switch 114. Switches 114 are illustratively conventional normally-open relays comprising an internal coil which, when energized with a 24 VDC basis from output module 34, closes an internal contact to thereby complete the circuit and transmit a signal to an output device 20, console 70, 72, or other node of control system 12.

Figure 6:
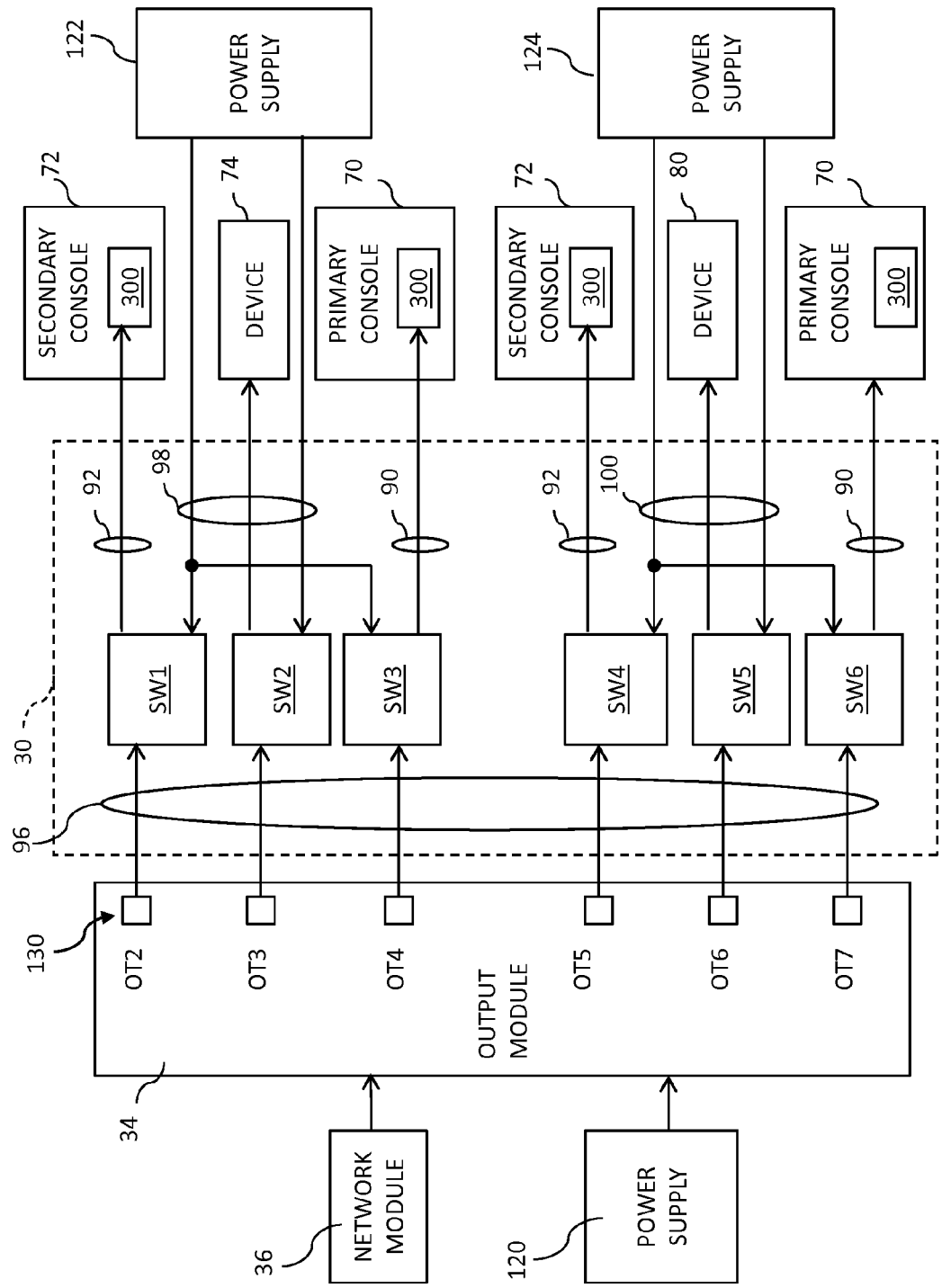
FIGS. 6 and 7 are block diagrams illustrating a safety interface in communication with the output module, operator consoles, and output devices of the control system of FIG. 2.
Figure 7:
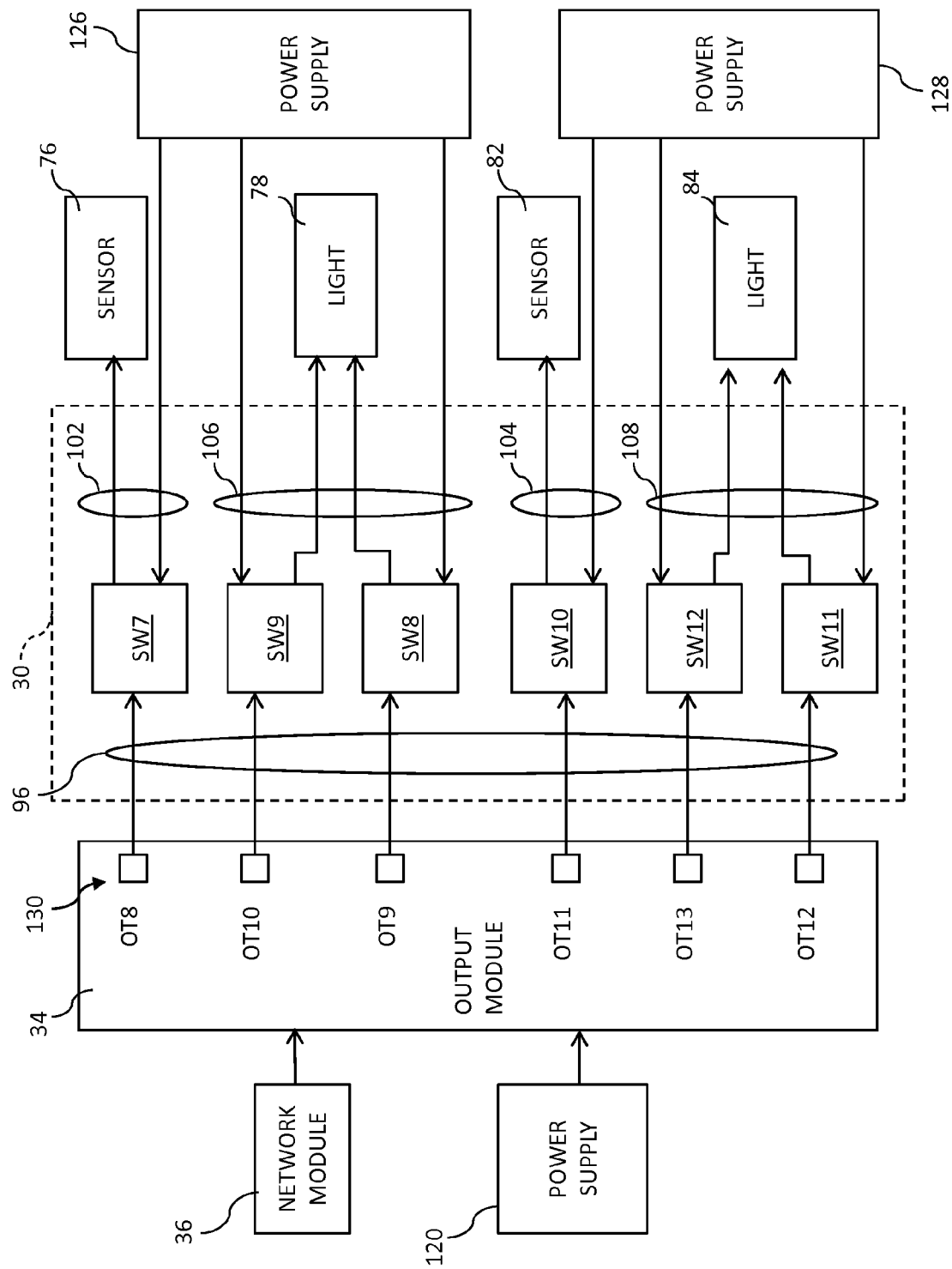

FIGS. 6 and 7 provide an illustration of output module 34 in communication with switches 114 of safety interface 30. Output module 34 is connected to an external power supply 120. In one embodiment, power supply 120 is a 24 VDC power supply. Upon receiving network signals from network module 36, output module 34 transmits corresponding output signals from output terminals 130, illustratively OT2-OT13, to switches 114. In the illustrated embodiment, the output signals from output terminals 130 are routed through connector 96 of safety interface 30 to switches 114. In the illustrated embodiment, the output signal is a 24 VDC signal provided by power supply 120, although other suitable signals may be used. Output signals from output module 34 are configured to energize switches 114 on safety interface 30 to close the switches 114, thereby permitting switches 114 to transmit signals to output devices 20 or consoles 70, 72. As shown in FIG. 6, OT2, OT3, OT4, OT5, OT6, and OT7 are electrically wired through connector 96 to SW1, SW2, SW3, SW4, SW5, and SW6, respectively, for transmitting output signals therebetween. As shown in FIG. 7, OT8, OT9, OT10, OT11, OT12, and OT13 are electrically wired through connector 96 to SW7, SW8, SW9, SW10, SW11, and SW12, respectively, for transmitting output signals therebetween.

Referring to FIG. 6, power supply 122 is coupled to SW1, SW2, and SW3 via connector 98, and power supply 124 is coupled to SW4, SW5, and SW6 via connector 100. In one embodiment, power supply 122 and power supply 124 are each 24 VDC power supplies, although other suitable power supplies may be used. Alternatively, power supply 122 and power supply 124 may be one power supply or may each include multiple power supplies. In the illustrative embodiment, power supply 122 is configured to provide power to device 74 and to control circuitry 300 of consoles 70 and 72, and power supply 124 is configured to provide power to device 80 and to control circuitry 300 of consoles 70 and 72.

Referring to FIG. 7, power supply 126 is coupled to SW7 via connector 102 and to SW8 and SW9 via connector 106. Power supply 128 is coupled to SW10 via connector 104 and to SW11 and SW12 via connector 108. In one embodiment, power supply 126 and power supply 128 are each 28 VDC power supplies, although other suitable power supplies may be used. Alternatively, power supply 126 and power supply 128 may be one power supply or may each include multiple power supplies. In the illustrative embodiment, power supply 126 is configured to provide power to sensor 76 and light 78, and power supply 128 is configured to provide power to sensor 82 and light 84.

Figure 8:
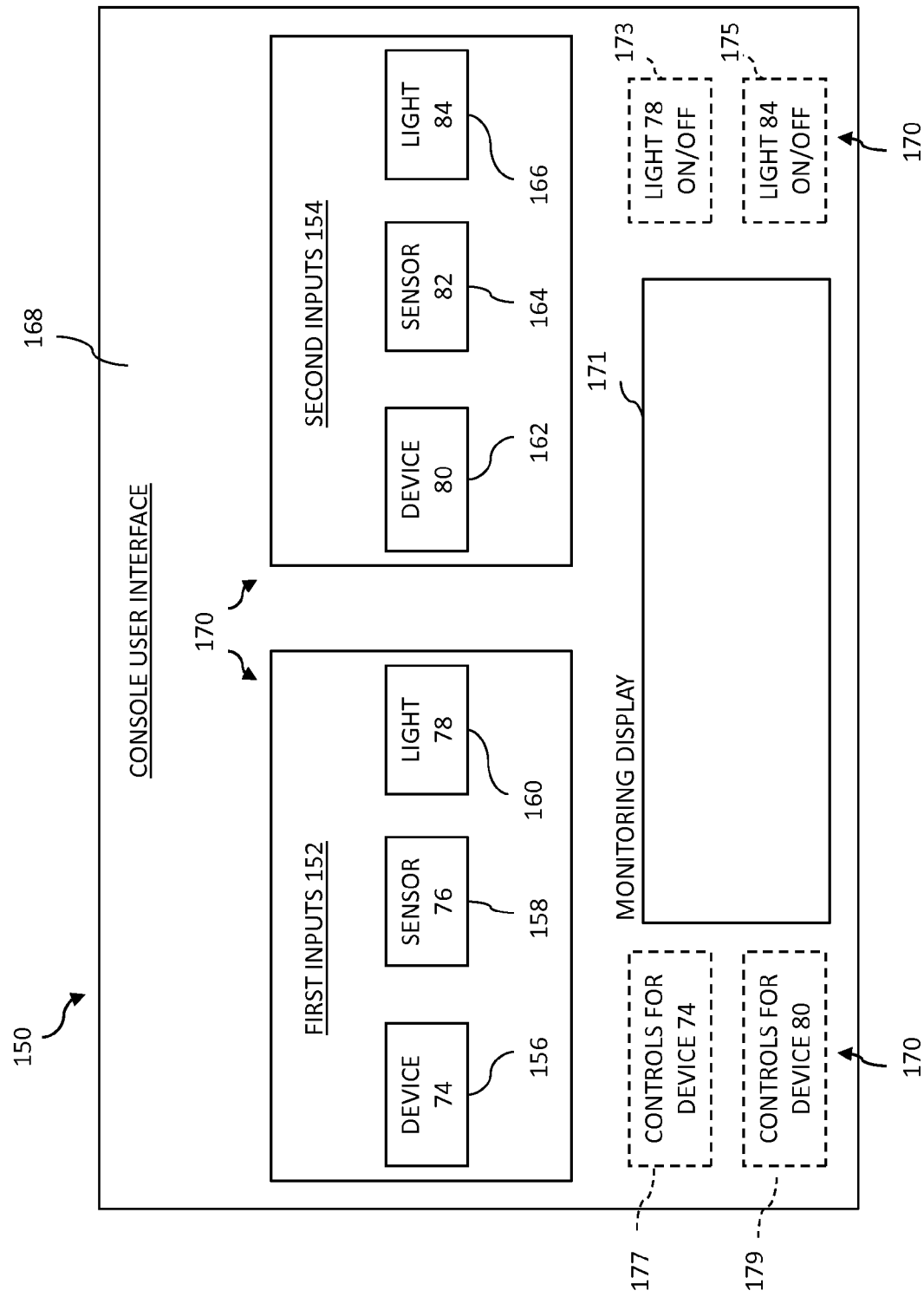
FIGS. 8 and 9 illustrate an exemplary user interface of an operator control console of the present disclosure.
Figure 9:
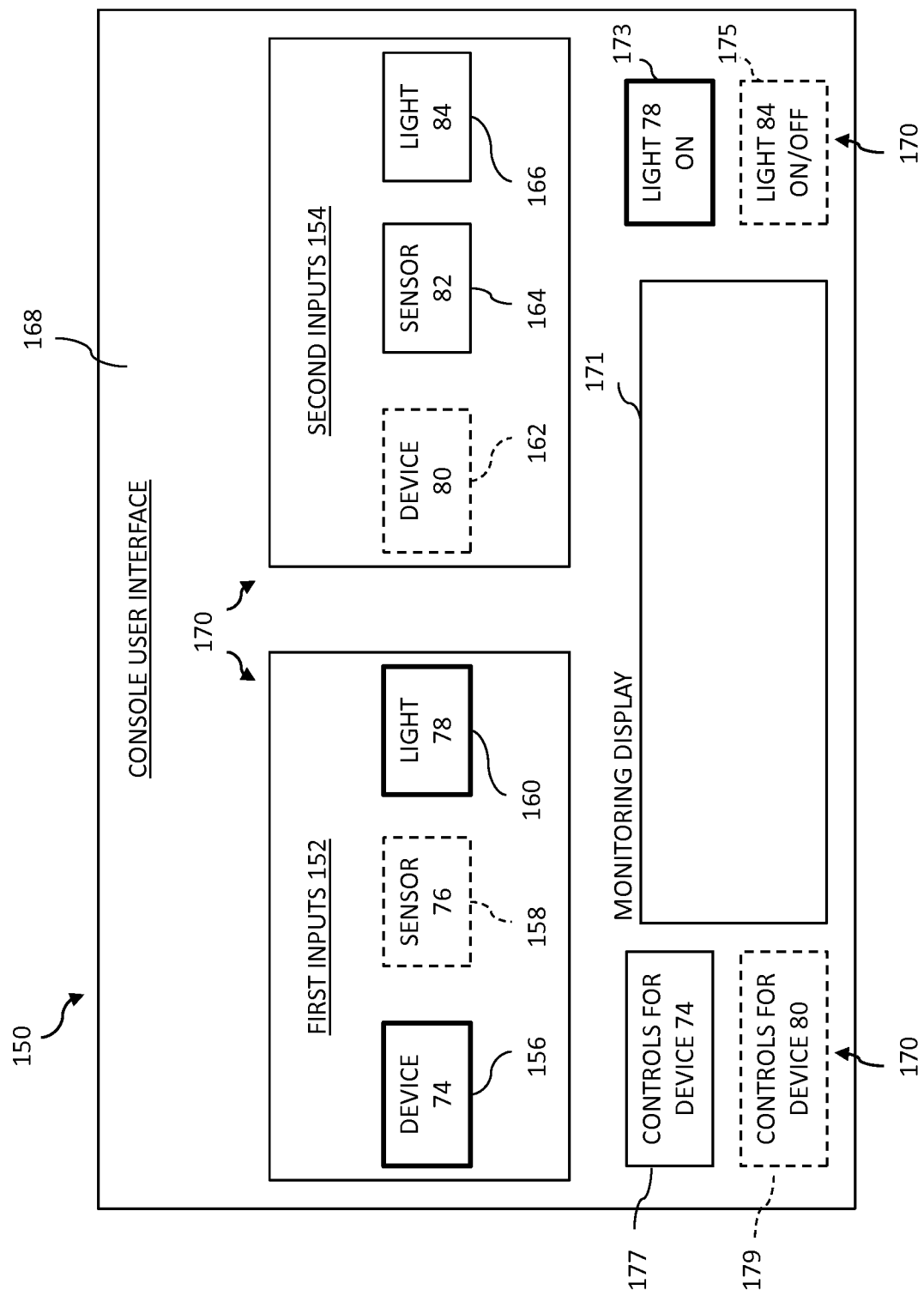

Referring to FIGS. 8 and 9, an exemplary user interface 150 of consoles 70 and 72 is shown. For discussion purposes, user interface 150 is described herein as the user interface at the "local" operator console, which may be either primary console 70 or secondary console 72. The "remote" operator console refers to the other of primary console 70 and secondary console 72. In this description, the local operator console is referenced as console 70 and the remote operator console is referenced as console 72, although these may be reversed. In one embodiment, user interface 150 includes a touchscreen for receiving user inputs, although any suitable user interface may be used which receives user inputs and provides control, manipulation, and/or monitoring of output devices 20 to an operator or user.

User interface 150 illustratively includes an interactive graphical display 168, such as on a touchscreen, which displays feedback and other relevant data from nodes on control system 12. In one embodiment, user interface 150 is configured to provide multiple graphical displays, navigable by an operator, which provide controls, video and data feedback, and/or status indication to the operator. FIGS. 8 and 9 illustrate an exemplary graphical display 168 of user interface 150, although other suitable graphical displays may be provided by user interface 150. For illustrative purposes, graphical display 168 shown in FIGS. 8 and 9 is simplified and illustrates only a few of the user inputs, illustratively touch cells or "virtual buttons" on a touchscreen, used in accordance with the present disclosure. Another type of instrument panel with physical switches, buttons, or other controls may be used in place of the user interface 150 for operator control consoles 70, 72.

Exemplary graphical display 168 of user interface 150 displays feedback from and provides controls to output devices 20 located in control system 12. Graphical display 168 includes a monitoring display 171 configured to provide feedback to the local operator console 70. In one embodiment, monitoring display 171 displays the status of the controls of control circuitry 300 of the local operator console 70, as described herein. In one embodiment, monitoring display 171 provides feedback from devices 20. Monitoring display 171 may alternatively provide feedback from other communication on control system 12.

Graphical display 168 includes a plurality of user inputs 170, illustratively including first inputs 152, second inputs 154, device inputs 177 and 179, and light inputs 173 and 175. First inputs 152 include a device cell 156, a sensor cell 158, and a light cell 160 corresponding to device 74, sensor 76, and light 78, respectively. Second inputs 154 similarly include a device cell 162, a sensor cell 164, and a light cell 166 corresponding to device 80, sensor 82, and light 84, respectively. In the illustrative embodiment, first inputs 152 and second inputs 154 are device selection inputs configured to select a corresponding output device 20 for control by the local operator console 70. In particular, first inputs 152 and second inputs 154 are each configured to assign control of the corresponding output device 20 to the local operator console 70 and disable control of the corresponding output device 20 by the remote operator console 72. In one embodiment, each of sensor cells 158 and 164 and light cells 160 and 166 are also configured to enable or activate the corresponding output device 20. In one embodiment, device inputs 177 and 179 are configured to enable devices 74 and 80, respectively, and light inputs 173 and 175 are configured to illuminate lights 78 and 84, respectively. Device inputs 177 and 179 may also activate corresponding output devices 20 and/or provide other control inputs for output devices 20. Alternatively, any desired number of user inputs 170 may be provided at graphical display 168 to perform any desired operation. In one embodiment, the plurality of user inputs 170 includes additional user inputs not illustrated in FIGS. 8 and 9.

In one embodiment, the availability of each of user inputs 170 for selection is indicated by the display of user inputs 170 on graphical interface 168. The availability of user inputs 170 depends on whether the corresponding output device 20 is available for control at the local console 70, as explained herein. In the illustrated embodiment, the user inputs 170 which are unavailable for selection are removed from graphical display 168 to disable the selection of these user inputs 170 by an operator. As such, the functionality of the unavailable user input 170 is disabled to block or limit access by an operator to the controls, feedback data, and/or display of the output device 20 corresponding to the unavailable user input 170. Referring to FIG. 8, each of first inputs 152 and second inputs 154 are illustratively displayed on graphical interface 168 and are thus available for selection. The dashed lines surrounding device inputs 177 and 179 and light inputs 173 and 175 indicate that these inputs are illustratively not displayed on graphical display 168 and are thus unavailable for selection. Alternatively, the local console 70 may indicate the unavailability of user inputs 170 on graphical display 168 by any other suitable indication of unavailability, such as by color coding or marking each available and unavailable user input 170.

The availability of first inputs 152 and second inputs 154 indicates the availability of each corresponding output device 20 for control at the local operator console 70. If one of output devices 20 is not available for control at the local operator console 70 (i.e. such as when the remote operator console 72 has been assigned to control the output device 20), the corresponding first input 152 or second input 154 configured to control that output device 20 is disabled at the local operator console 70 to prevent the local operator console 70 from gaining control of that output device 20. In one embodiment, the local operator console 70 is also not able to monitor some or all feedback from the output device 20 corresponding to the disabled user input 170. Referring to FIG. 9, sensor cell 158 and device cell 162 are illustratively each unavailable for selection which prevents an operator from gaining control of sensor 76 and device 80, respectively.

In the illustrated embodiment, device inputs 177 and 179 and light inputs 173 and 175 are made available for selection on graphical display 168 by the selection of device cells 156 and 162 and light cells 160 and 166, respectively. As such, when any of device cells 156 and 162 and light cells 160 and 166 are unavailable at the local operator console 70, the corresponding device inputs 177 and 179 and light inputs 173 and 175 are unavailable. For example, referring to FIG. 9, device cell 156 and light cell 160 are illustratively selected. As such, device input 177 and light input 173 are illustratively available for selection. In FIG. 9, light input 173 is also illustratively selected, which provides illumination to light 78.

User inputs 170, as well as control circuitry 300, provide various control inputs for output devices 20, and DIO system 10 coordinates, monitors, and distributes these controls. Selection of an appropriate one of user inputs 170 at the local operator console 70 assigns control of the corresponding output device 20 to the local operator console 70 and disables control of the corresponding output device 20 at the remote operator console 72, as explained herein with reference to FIG. 10. In one embodiment, the selection of an appropriate one of user inputs 170 also enables the local console 70 to control the corresponding output device 20, such as by providing power to control circuitry 300, as explained herein with reference to FIG. 11. In one embodiment, the selection of sensor cells 158 and 164 and light cells 160 and 166 activates sensors 76 and 82 and lights 78 and 84, respectively, and the selection of device inputs 177 and 179 activates devices 74 and 80, respectively, as explained herein with reference to FIG. 12. In one embodiment, upon selecting one of user inputs 170, another graphical display may appear on user interface 150 providing information, feedback, and/or controls, including additional user inputs, pertaining to the corresponding output device 20 selected.

Figure 10:
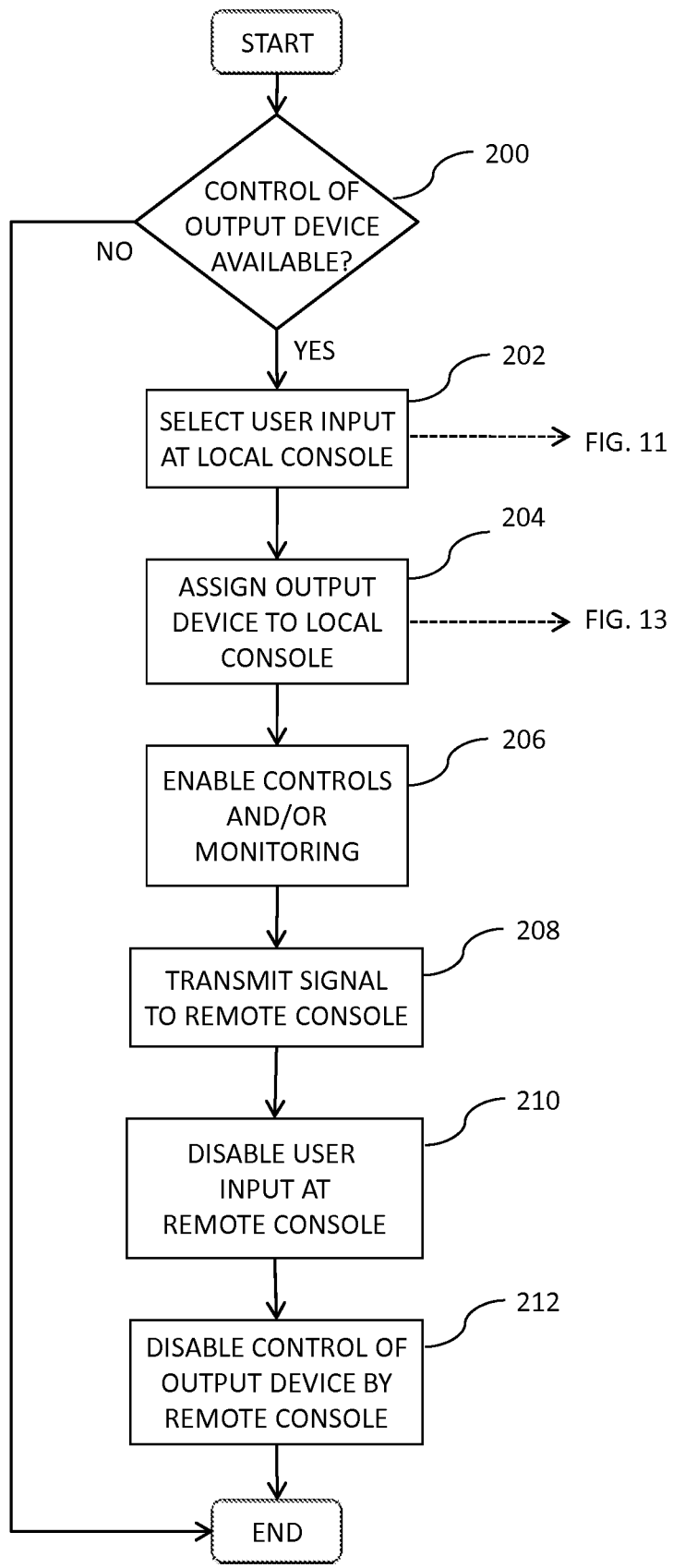
FIG. 10 is a flowchart illustrating steps for assigning control of an output device to an operator console.

The flowchart of FIG. 10 illustrates one embodiment of assigning to an operator console the control and/or monitoring capability of one of output devices 20. By assigning control of an output device to the local operator console 70, the ability of the remote operator console 72 to control the output device 20 assigned to local operator console 70 is disabled, as described herein. As such, the likelihood of output devices 20 receiving conflicting control signals from multiple operator consoles 70, 72 is reduced or eliminated.

Referring to FIG. 10, it is first determined whether the control of the output device 20 is available at the local operator console 70, as represented by block 200. As described above, the availability of each output device 20 for control by the local console 70 is determined by the display of the corresponding user input 170 for selection at the local console 70. If the corresponding user input 170 is available for selection at the local console 70, the corresponding output device 20 is available for control by the local console 70. In one embodiment, the unavailability of the output device 20 for control by the local console 70 may result from the remote console 72 already being in control of that output device 20.

If the output device 20 is available for control, the operator selects the corresponding one of first inputs 152 and second inputs 154 at the local operator console 70, as represented by block 202 of FIG. 10. The output device 20 is thereby assigned to the local operator console 70, as illustrated at block 204. In one embodiment, prior to assigning the output device 20 to the local console 70, software at local console 70 first verifies that the selected output device 20 is available for control and no faults or other conflicts have occurred, as described herein with reference to FIG. 19. Upon being assigned to control the output device 20, the local operator console 70 is able to control and/or monitor the output device 20 as illustrated at block 206. At block 206, access to controls, feedback, and/or other monitoring data for the output device 20 is made available on user interface 150 of the local operator console 70. For example, referring to FIG. 9, the selection of device cell 156 and light cell 160 respectively provides access to device input 177, which allows an operator to activate or otherwise control device 74, and to light input 173, which allows an operator to turn on or off the lamp in light 78.

As represented by block 208, the local operator console 70 transmits a signal, illustratively a network signal over the communication network 29, to the remote operator console 72. When remote operator console 72 receives the signal, the user input 170 at the remote operator console 72 corresponding to the output device 20 assigned to the local operator console 70 is disabled and becomes unavailable for selection, as represented by block 210. Accordingly, the control of the output device 20 by the remote operator console 72 is prevented or disabled, as illustrated at block 212. In one embodiment, monitoring of the output device 20 by the remote console 72 is also prevented or disabled. As such, only the local operator console 70 is configured to control and monitor the output device 20. In one embodiment, software on main computer 28, illustrated in FIGS. 1 and 2, contains instructions to coordinate the disabling of the appropriate user input 170 at the remote operator console 72, as described herein with reference to FIG. 11a. In particular, the network signal transmitted from the local operator console 70 over communication network 29 at block 208 is received by server 28. Upon verifying that remote console 72 does not have control of the desired output device 20 and that no other conflicts exist, server 28 transmits a network signal over communication network 29 to the remote operator console 72 to disable the appropriate user input 170 at the remote operator console 72. Server 28 may also send a network signal back to local console 70 to provide confirmation to local console 70 that no conflicts exist and to acknowledge assignment of the output device 20 to the local console 70.

Each of first inputs 152 and second inputs 154 is configured to assign control and/or monitoring of the corresponding output device 20 to the local operator console 70 and disable control and/or monitoring of the corresponding output device 20 at the remote console 72. For example, the selection of device cell 156 or 162 at primary console 70 assigns control of device 74 or 80, respectively, to primary console 70 while disabling control of the selected device 74 or 80 by secondary console 72. The selection of sensor cell 158 or 164 at primary console 70 assigns control of sensor 76 or 82, respectively, to primary console 70 while disabling control of the selected sensor 76 or 82 by secondary console 72. The selection of light cell 160 or 166 at primary console 70 assigns control of light 78 or 84, respectively, to primary console 70 while disabling control of the selected light 78 or 84 by secondary console 72. Similarly, the selection of first inputs 152 and second inputs 154 at secondary console 72 assigns control of corresponding output devices 20 to secondary console 72 and disables control of corresponding output devices 20 at primary console 70.

Figure 11:
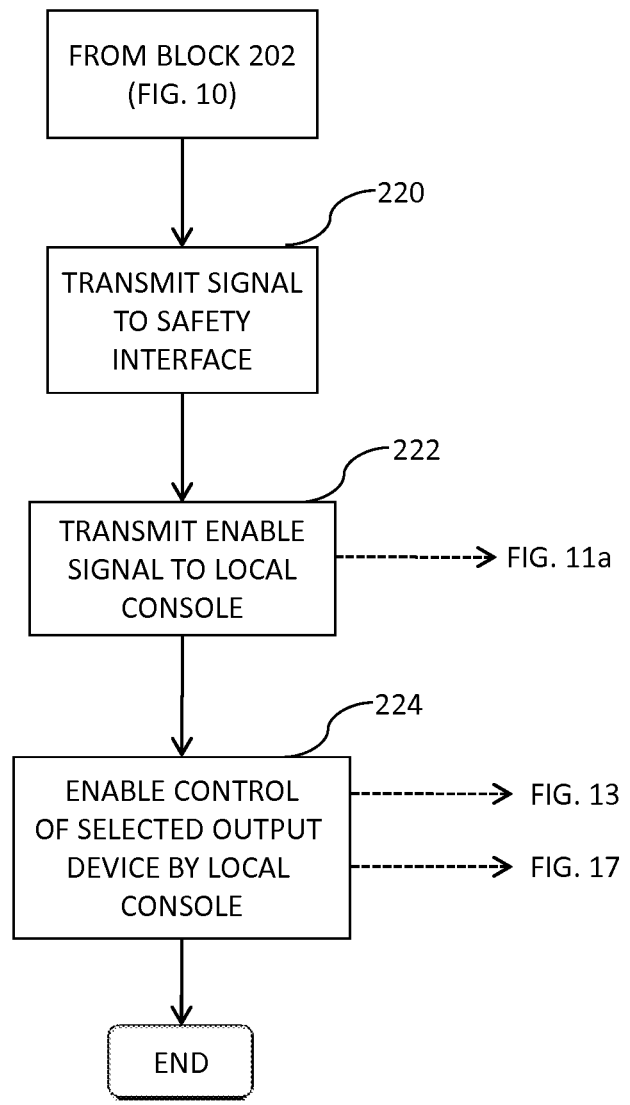
FIG. 11 is a flowchart illustrating steps for enabling control of an output device at an operator console.

The flowchart of FIG. 11 provides an illustrated embodiment for enabling an operator console to control output devices 20, in particular devices 74 and 80. Upon selection of one of first inputs 152 and second inputs 154 at block 202 of FIG. 10, the local operator console 70 is configured to transmit a signal to safety interface 30 of DIO system 10, as represented by block 220 of FIG. 11. In the illustrated embodiment, the signal is a network signal sent by the local operator console 70 over communication network 29, received by output module 34 via network module 36, and converted to an output signal sent from output module 34 to one of switches 114 on safety interface 30. In one embodiment, the network signal is simultaneously sent to both the remote operator console 72 in block 208 of FIG. 10 and to safety interface 30 (via output module 34) as illustrated at block 220 of FIG. 11.

Upon receipt of the signal, safety interface 30 transmits an enable signal from switch 114 to the local operator console 70, as represented by block 222. The enable signal is configured to enable the local operator console 70 to control the selected one of devices 74 and 80, as represented by block 224. The enable signal may alternatively enable the local operator console 70 to control one of sensors 76 and 82 and lights 78 and 84 when appropriate user inputs 170 are selected. In the illustrated embodiment, the enable signal is a power signal configured to provide power to control circuitry 300 at the local operator console 70 for controlling one of devices 74 and 80.

For example, the embodiment of FIG. 11 will now be described with reference to FIGS. 6 and 8 for enabling control of device 74 at primary console 70 or secondary console 72. Upon selecting device cell 156 at primary console 70, a network signal is transmitted over communication network 29 to server 28. As described above with reference to FIG. 10, control of device 74 at secondary console 72 is disabled when device cell 156 is selected at primary console 70. Output module 34 of DIO system 10 receives the network signal via network module 36 and transmits a corresponding output signal from OT4 through connector 96 to SW3 on safety interface 30. Upon receiving the output signal, SW3 is energized and transmits an enable signal through connector 90 to primary console 70. The enable signal illustratively provides 24 VDC from power supply 122 to control circuitry 300 of primary console 70 to enable control of device 74 at primary console 70.

Alternatively, upon selecting device cell 156 at secondary console 72, a network signal is transmitted over communication network 29 to server 28. As described above with reference to FIG. 10, control of device 74 at primary console 70 is disabled when device cell 156 is selected at secondary console 72. Output module 34 of DIO system 10 receives the network signal via network module 36 and transmits a corresponding output signal from OT2 through connector 96 to SW1 on safety interface 30. Upon receiving the output signal, SW1 is energized and transmits an enable signal through connector 92 to secondary console 72. The enable signal illustratively provides 24 VDC from power supply 122 to control circuitry 300 of secondary console 72 to enable control of device 74 at secondary console 72.

Similarly, control of device 80 may be enabled at primary console 70 or secondary console 72. Upon selecting device cell 162 at primary console 70, a network signal is transmitted over communication network 29 to server 28. As described above with reference to FIG. 10, control of device 80 at secondary console 72 is disabled when device cell 162 is selected at primary console 70. Output module 34 of DIO system 10 receives the network signal via network module 36 and transmits a corresponding output signal from OT7 through connector 96 to SW6 on safety interface 30. Upon receiving the output signal, SW6 is energized and transmits an enable signal through connector 90 to primary console 70. The enable signal illustratively provides 24 VDC from power supply 124 to control circuitry 300 of primary console 70 to enable control of device 80 at primary console 70.

Alternatively, upon selecting device cell 162 at secondary console 72, a network signal is transmitted over communication network 29 to server 28. As described above with reference to FIG. 10, control of device 80 at primary console 70 is disabled when device cell 162 is selected at secondary console 72. Output module 34 of DIO system 10 receives the network signal via network module 36 and transmits a corresponding output signal from OT5 through connector 96 to SW4 on safety interface 30. Upon receiving the output signal, SW4 is energized and transmits an enable signal through connector 92 to secondary console 72. The enable signal illustratively provides 24 VDC from power supply 124 to control circuitry 300 of secondary console 72 to enable control of device 80 at secondary console 72.

Figure 11A:
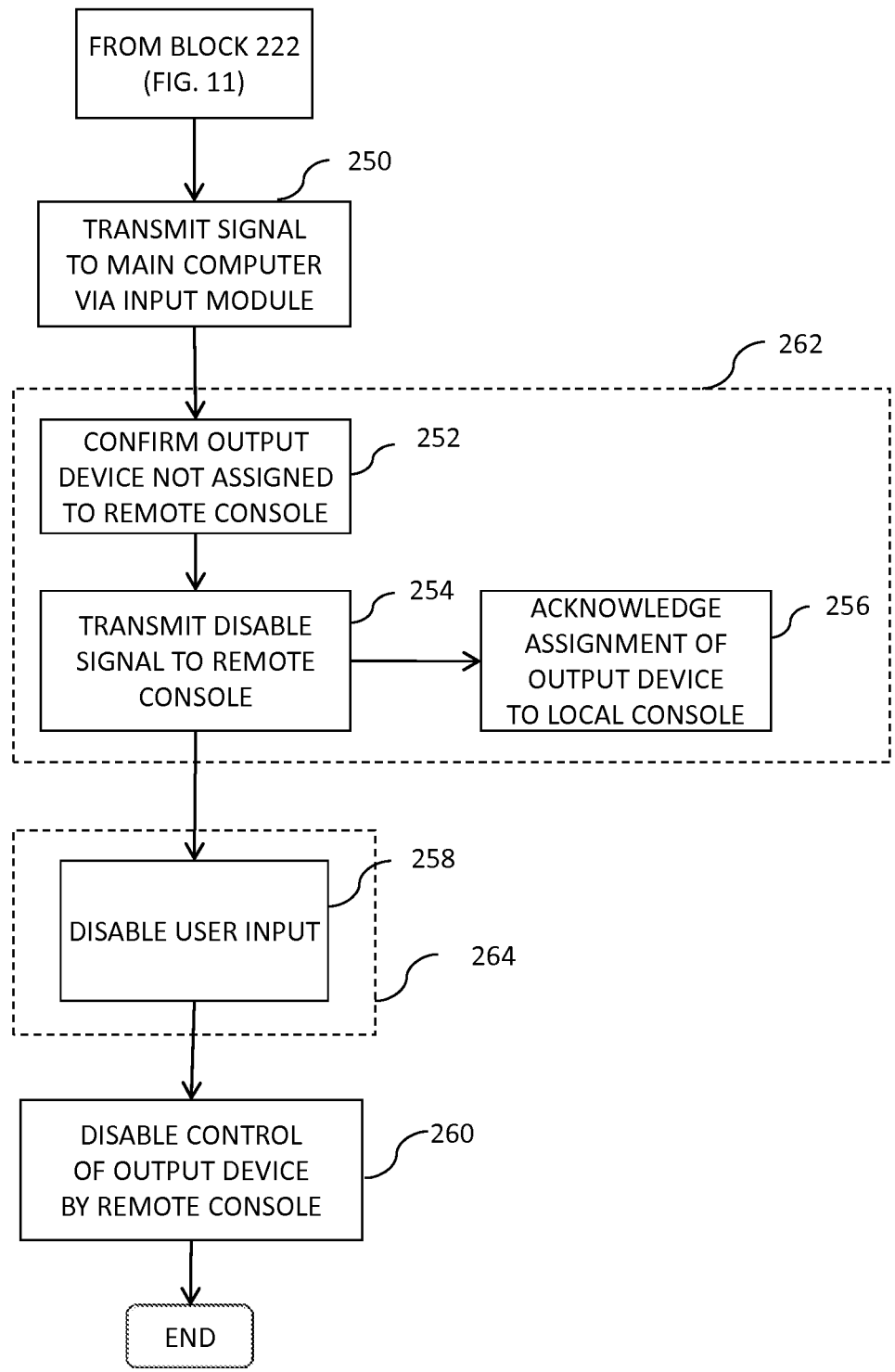
FIG. 11a is a flowchart illustrating steps for disabling the control of an output device by a remote operator console.

As described above, disabling control by remote console 72 of the output device 20 that was selected for control by local console 70 (illustrated in the flowchart of FIG. 10) may be coordinated by main computer 28 over communication network 29. Referring to FIG. 11a, software 262 on main computer 28 may disable the appropriate user input 170 at remote console 72 corresponding to the output device 20 selected at local console 70. As described above, upon selection of one of first and second inputs 152 and 154 at local console 70 (block 202 of FIG. 10), local console 70 transmits a signal to safety interface 30 (block 220 of FIG. 11); in response, safety interface 30 transmits a corresponding enable signal to local console 70 (block 222 of FIG. 11). As illustrated in block 250 of FIG. 11a, this enable signal sent to local console 70 is also sent to input module 32 for receipt by main computer 28 over communication network 29. Upon receipt of the signal by main computer 28, software 262 at main computer 28 confirms that the selected output device 20 is not already assigned to remote console 72, as represented by block 252. Software 262 may also confirm at block 252 that no other conflicts or faults exist at the selected output device 20 or at remote console 72. If no conflicts or other errors exist, software 262 instructs main computer 28 to transmit a disable signal to remote console 72, as represented by block 254. Software 262 may also instruct main computer 28 to acknowledge assignment of the output device 20 to the local console 70, as represented by block 256. This acknowledgment may be in the form of an acknowledgment signal sent over communication network 29 back to local console 70. In one embodiment, local console 70 is assigned control of the selected output device 20 only upon receipt of the acknowledgment signal from main computer 28 in block 256.

Upon receiving the disable signal sent by main computer 28 at block 254, remote console 72 disables the corresponding user input 170 at user interface 150, as represented by block 258. In particular, software 264 at remote console 72 contains instructions that disable the user input 170 on user interface 150 upon receipt of the disable signal from main computer 28. By disabling the user input 170 at block 258, control of the output device 20 by remote console 72 is disabled, as represented by block 260.

Figure 12:
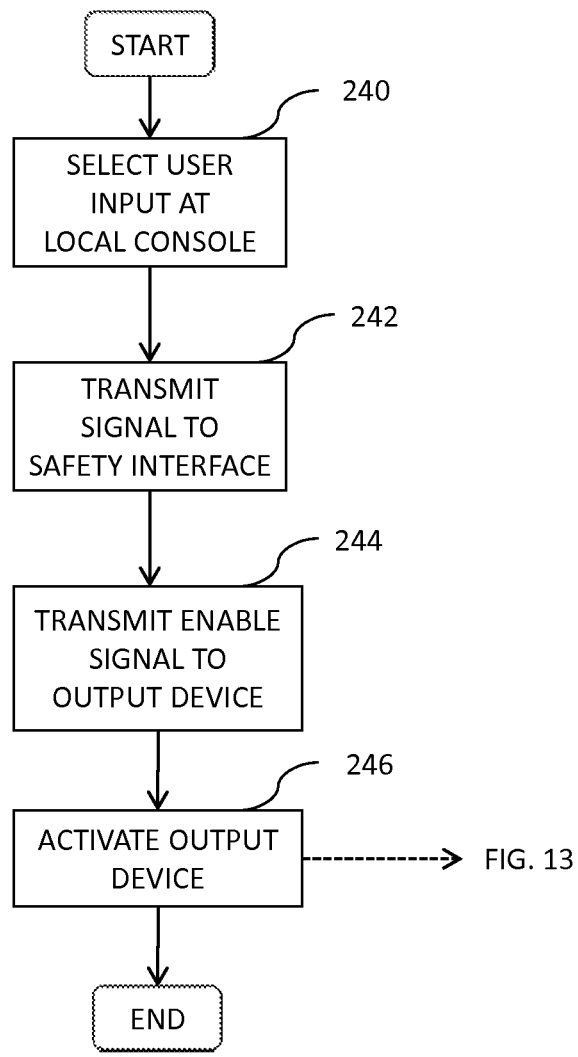
FIG. 12 is a flowchart illustrating steps for enabling an output device from an operator console.

In one illustrated embodiment, user inputs 170 are also configured to activate or enable output devices 20, as illustrated in FIG. 12. Upon selection of an appropriate one of user inputs 170 at block 240, the local operator console 70 is configured to transmit a signal to safety interface 30 of DIO system 10, as represented by block 242. In the illustrated embodiment, the signal is a network signal sent by the local operator console 70 over communication network 29, received by output module 34 via network module 36, and converted to an output signal sent from output module 34 through connector 96 to one of switches 114 on safety interface 30. Upon receipt of the signal, safety interface 30 transmits an enable signal from the switch 114 to the appropriate one of output devices 20 as illustrated at block 244. Upon receipt of the enable signal, the output device 20 is activated or powered up, as represented by block 246.

FIG. 12 is described herein with reference to FIGS. 6-8 for activating or enabling output devices 20. In the illustrated embodiment, selection of sensor cells 158 and 164 and light cells 160 and 166 activates or enables the corresponding output device 20, while the selection of device inputs 177 and 179 activates or enables devices 74 and 80, respectively. For example, upon selection of sensor cell 158 at one of operator consoles 70 and 72, a network signal is transmitted over communication network 29 to server 28. Output module 34 of DIO system 10 receives the network signal via network module 36 and transmits a corresponding output signal from OT8 through connector 96 to SW7 on safety interface 30. Upon receiving the output signal, SW7 is energized and transmits an enable signal through connector 102 to sensor 76 to activate sensor 76. The enable signal from SW7 is illustratively a ground or "active low" signal provided by power supply 126. In the illustrated embodiment, energizing SW7 completes a circuit between power supply 126 and sensor 76 by grounding a 28 VDC signal provided from power supply 126 to sensor 76. Alternatively, SW7 may provide a power signal, such as 28 VDC, directly to sensor 76.

Similarly, upon selection of sensor cell 164 at one of consoles 70 and 72, a network signal is transmitted over communication network 29 to server 28. Output module 34 of DIO system 10 receives the network signal via network module 36 and transmits a corresponding output signal from OT11 through connector 96 to SW10 on safety interface 30. Upon receiving the output signal, SW10 is energized and transmits an enable signal through connector 104 to sensor 82 to activate sensor 82. The enable signal from SW10 is illustratively a ground or "active low" signal provided by power supply 128. In the illustrated embodiment, energizing SW10 completes a circuit between power supply 128 and sensor 82 by grounding a 28 VDC signal provided from power supply 128 to sensor 82. Alternatively, SW10 may provide a power signal, such as 28 VDC, directly to sensor 82.

In another example, upon selection of light cell 160 at one of consoles 70 and 72, a network signal is transmitted over communication network 29 to server 28. Output module 34 of DIO system 10 receives the network signal via network module 36 and transmits a corresponding output signal from OT10 through connector 96 to SW9 on safety interface 30. Upon receiving the output signal, SW9 is energized and transmits an enable signal through connector 106 to light 78 to activate light 78. The enable signal from SW9 is illustratively a ground or "active low" signal provided by power supply 126. In the illustrated embodiment, energizing SW9 completes a circuit between power supply 126 and light 78 by grounding a 28 VDC signal provided from power supply 126 to light 78. Alternatively, SW9 may provide a power signal, such as 28 VDC, directly to light 78.

Similarly, upon selection of light cell 166, a network signal is transmitted over communication network 29 to server 28. Output module 34 of DIO system 10 receives the network signal via network module 36 and transmits a corresponding output signal from OT13 through connector 96 to SW12 on safety interface 30. Upon receiving the output signal, SW12 is energized and transmits an enable signal through connector 108 to light 84 to power up or activate light 84. The enable signal from SW12 is illustratively a ground or "active low" signal provided by power supply 128. In the illustrated embodiment, energizing SW12 completes a circuit between power supply 128 and light 84 by grounding a 28 VDC signal provided from power supply 128 to light 84. Alternatively, SW12 may provide a power signal, such as 28 VDC, directly to light 84.

The activation of light 78 or 84 upon selection of light cell 160 or 166, respectively, as shown in FIG. 12, illustratively provides power to a gimbal or other light-carrying apparatus configured to move or manipulate light 78 or 84. In one embodiment, light inputs 173 and 175 are configured to energize a lamp or bulb in lights 78 and 84, respectively. For example, the selection of light input 173 at one of consoles 70 and 72 transmits a network signal to output module 34, which transmits a corresponding output signal from OT9 to SW8 via connector 96. Upon receiving the output signal, SW8 is energized and transmits an enable signal, illustratively a ground signal from power supply 126, to light 78 via connector 106 to energize a lamp in light 78. Similarly, the selection of light input 175 at one of consoles 70 and 72 transmits a network signal to output module 34, which transmits a corresponding output signal from OT12 to SW11 via connector 96. Upon receiving the output signal, SW11 is energized and transmits an enable signal, illustratively a ground signal from power supply 128, to light 84 via connector 108 to energize a lamp in light 84. Alternatively, the selection of light cells 160 and 166 may also energize the lamps in lights 78 and 84, respectively.

In the illustrated embodiment, the selection of device inputs 177 and 179 activate or enable devices 74 and 80, respectively. In one embodiment, device input 177 is enabled upon the selection of device cell 156, and device input 179 is enabled upon the selection of device cell 162. Referring to FIGS. 6 and 12, upon selection of device input 177 at one of consoles 70 and 72, a network signal is transmitted over communication network 29 to output module 34, which transmits a corresponding output signal from OT3 through connector 96 to SW2 on safety interface 30. Upon receiving the output signal, SW2 is energized and transmits an enable signal through connector 98 to device 74 to activate or provide power to device 74. The enable signal from SW2 is illustratively a ground or "active low" signal provided by power supply 122. In the illustrated embodiment, the ground signal provided to device 74 upon energizing SW2 completes a circuit between power supply 122 and device 74 and enables device 74 to receive 24 VDC from power supply 122. Alternatively, SW2 may provide a power signal, such as 24 VDC from power supply 122, directly to device 74.

Similarly, upon selection of device input 179 at one of consoles 70 and 72, a network signal is transmitted over communication network 29 to output module 34, which transmits a corresponding output signal from OT6 through connector 96 to SW5 on safety interface 30. Upon receiving the output signal, SW5 is energized and transmits an enable signal through connector 100 to device 80 to activate or provide power to device 80. The enable signal from SW5 is illustratively a ground or "active low" signal provided by power supply 124. In the illustrated embodiment, the ground signal provided to device 80 upon energizing SW5 completes a circuit between power supply 124 and device 80 and enables device 80 to receive 24 VDC from power supply 124. Alternatively, SW5 may provide a power signal, such as 24 VDC from power supply 124, directly to device 80.

Figure 15:
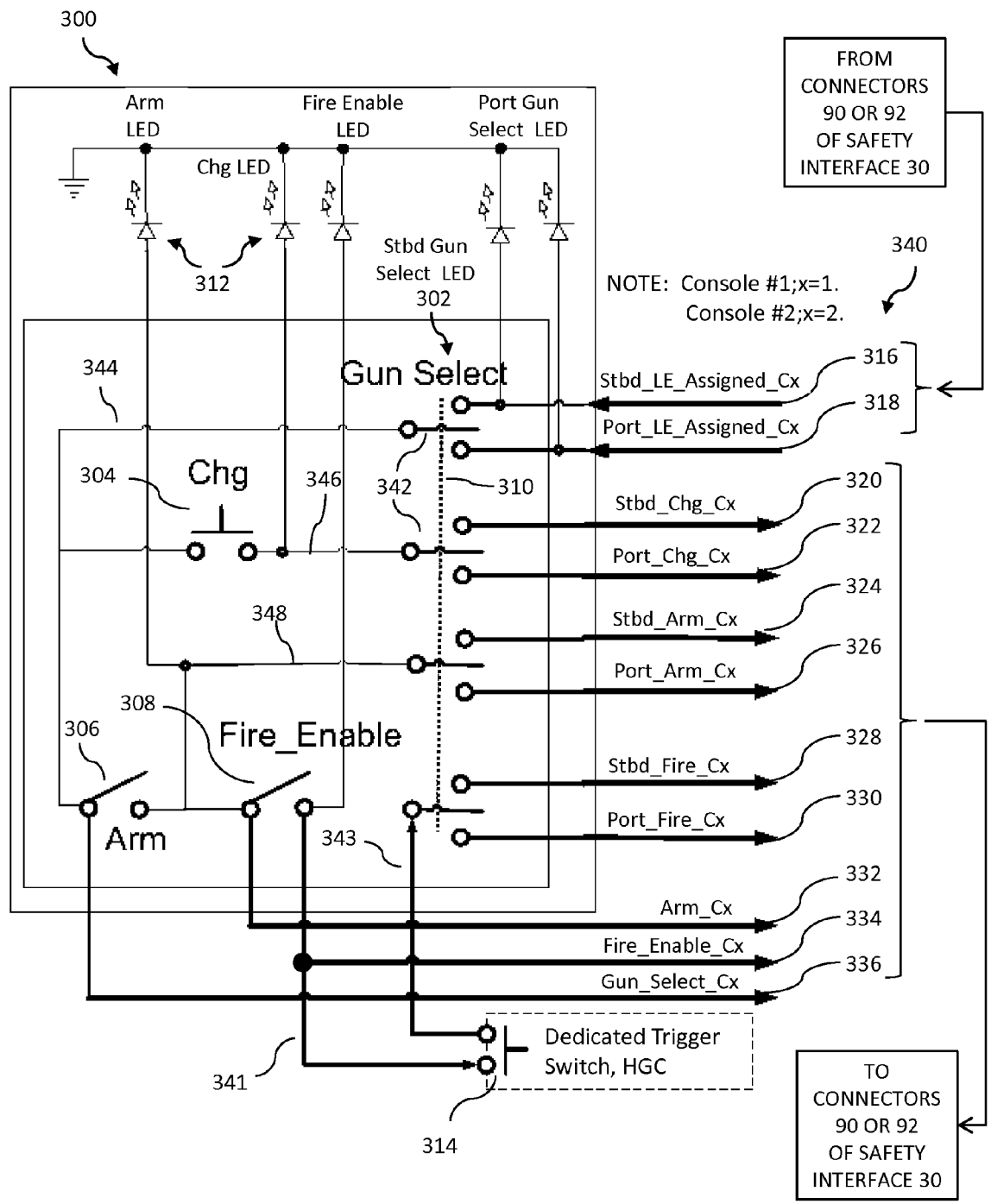
FIG. 15 illustrates exemplary control circuitry of an operator console of the present disclosure.

In other words, in one illustrated embodiment, the selected output device 20 is automatically activated or enabled when a user input 170 for the particular output device 20 is selected. In another illustrated embodiment, the output device 20 is not activated or enabled until a separate device control input (such as input 177 or 179) is selected by an operator. In this embodiment, additional controls (either controls on the graphical user interface 150 or separate controls such as illustrated in FIG. 15, for example) are then used to control the output device 20 after it has been activated or enabled.

Figure 13:
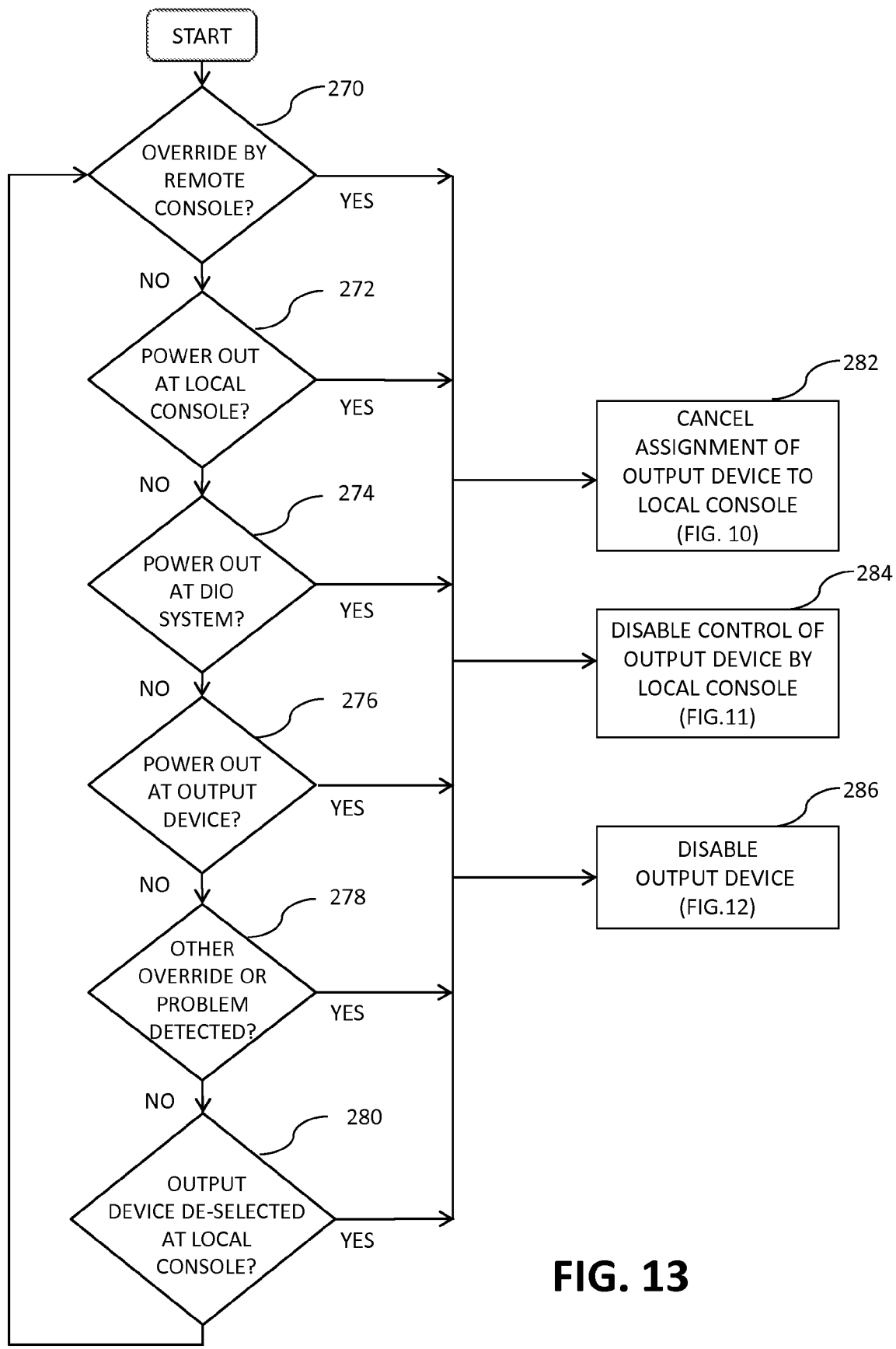
FIG. 13 is a flowchart illustrating steps for disabling control of or deactivating an output device.

Referring now to FIG. 13, power to at least one of output devices 20 is removed or control of at least one of output devices 20 at the local operator console 70 is disabled upon the occurrence of an event. As shown in FIG. 13, exemplary events include an override by the remote operator console 72 as illustrated at block 270, a power outage at the local console 70 as illustrated at block 272, a power outage at DIO system 10 as illustrated at block 274, a power outage at the output device 20 as illustrated at block 276, any other control override or detected problems as illustrated at block 278, and de-selection of the output device 20 at the local operator console 70 as illustrated at block 280. As represented by block 282, if any of the events illustrated in blocks 270-280 occur, the assignment of the output device to the local operator console 70 (shown in block 204 of FIG. 10) is cancelled or removed. As represented by block 284, if any of the events illustrated in blocks 270-280 occur, the control of the output device by the local operator console 70 (shown in block 224 of FIG. 11) is disabled. As represented by block 286, if any of the events illustrated in blocks 270-280 occur, the activated output device 20 (shown in block 246 of FIG. 12) is disabled. Software at local console 70, remote console 72, and main computer 28 may continuously monitor for the events in blocks 270 through 280 and may contain instructions for performing the actions illustrated in blocks 282, 284, and 286.

DIO system 10 and safety interface 30 may be used in a variety of applications. In one embodiment, DIO system 10 and safety interface 30 are implemented in a ship protection system, in particular a ship protection system for a naval or military vessel. As mentioned above, the ship protection system, which is illustrated by control system 12 of FIGS. 1 and 2, is configured to conduct surveillance of the area surrounding the vessel and evaluate and respond to identified threats to the vessel.

In a ship protection system, exemplary lights 78 and 84 are high-intensity searchlights commonly used as surveillance lighting on military or law enforcement vehicles, ships, or aircraft and may have automatic object-tracking capability. Devices 74 and 80 of FIGS. 1 and 2 illustratively correspond to weapons or lethal effectors 74 and 80, respectively, configured to receive control signals from at least two consoles 14, illustratively consoles 70 and 72, for enabling, arming, charging, and firing each weapon 74 and 80. Exemplary sensors 76 and 82 are electro-optical sensors each including a video camera providing video and/or data feedback to consoles 70 and 72. In one embodiment, each sensor 76 and 82 comprises a plurality of cameras, including infrared or thermal, laser, and/or standard video cameras, mounted on a turret unit and configured to provide multiple camera feedback signals for display on consoles 70 and 72.

In one embodiment, weapon 74, sensor 76, and light 78 are positioned on a port side of the vessel, while weapon 80, sensor 82, and light 84 are positioned on a starboard side of the vessel. Similarly, power supplies 122 and 126 are located on the port side of the vessel, and power supplies 124 and 128 are located on the starboard side of the vessel. Power supplies 122, 124, 126, and 128 may be power panels utilized by other devices or systems on the vessel.

Figure 14:
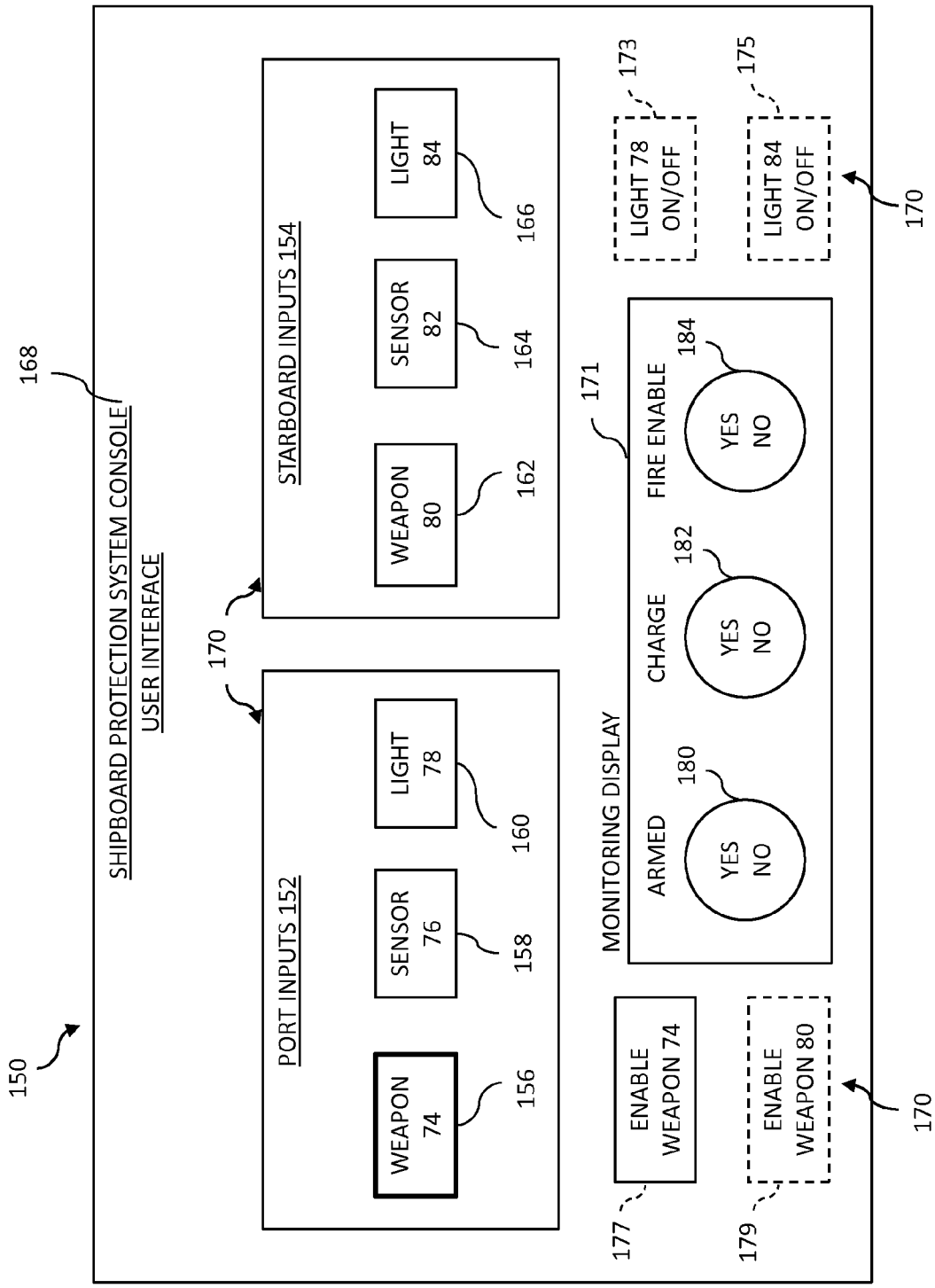
FIG. 14 illustrates an exemplary user interface of an operator console of the present disclosure.

Referring to FIG. 14, an exemplary user interface 150 of a ship protection system is illustrated. Port inputs 152 correspond to first inputs 152 of FIGS. 8 and 9 and provide control of output devices 20 located on the port side of the vessel, illustratively weapon 74, sensor 76, and light 78. Similarly, starboard inputs 154 correspond to second inputs 154 of FIGS. 8 and 9 and provide control to output devices 20 located on the starboard side of the vessel, illustratively weapon 80, sensor 82, and light 84. Monitoring display 171 monitors the status of the control signals transmitted from control circuitry 300 to weapons 74 and 80. Monitoring display 171 illustratively includes indicators 180, 182, and 184 to indicate the firing status of one of weapons 74 and 80. Indicator 180 provides indication of whether one of weapons 74 and 80 is armed. Indicator 182 provides indication of whether one of weapons 74 and 80 is charged. Indicator 184 provides indication of whether the firing of one of weapons 74 and 80 is enabled. In FIG. 14, device cell 156 is illustratively selected. As such, indicators 180-184 illustratively correspond to the firing status of weapon 74. Alternatively, indicators 180-184 may simultaneously indicate the firing status of both weapon 74 and weapon 80.

Referring now to FIG. 15, exemplary control circuitry 300 of primary and secondary consoles 70 and 72 is shown. Control circuitry 300 is configured to communicate arm, charge, fire enable, and fire commands from the local operator console 70 to weapons 74 and 80. Control circuitry 300 includes selector switch 302, charge switch 304, arm switch 306, fire enable switch 308, and trigger switch 314. Selector switch 302 illustratively toggles between two positions to select one of weapon 74 and weapon 80 for control at the local operator console 70. As illustrated in FIG. 15, selector switch 302 includes a plurality of two-position contacts 342 connected by a link 310. Contacts 342 of selector switch 302 include a PORT position for providing control to weapon 74 and a STARBOARD position for providing control to weapon 80. Selector switch 302 is configured to simultaneously move each contact 342 between the PORT position and the STARBOARD position. In the illustrated embodiment, trigger switch 314 is a hand controller such as a joystick, but other suitable trigger devices may be used. Control circuitry 300 illustratively further includes LEDs 312 which provide status indication of the arm, charge, fire enable, and fire commands as well as indication of whether weapon 74 or 80 has been selected for control by the local operator console 70. LEDs 312 illustratively include ARM LED, CHG LED, FIRE ENABLE LED, STBD GUN SELECT LED, and PORT GUN SELECT LED.

Figure 18:
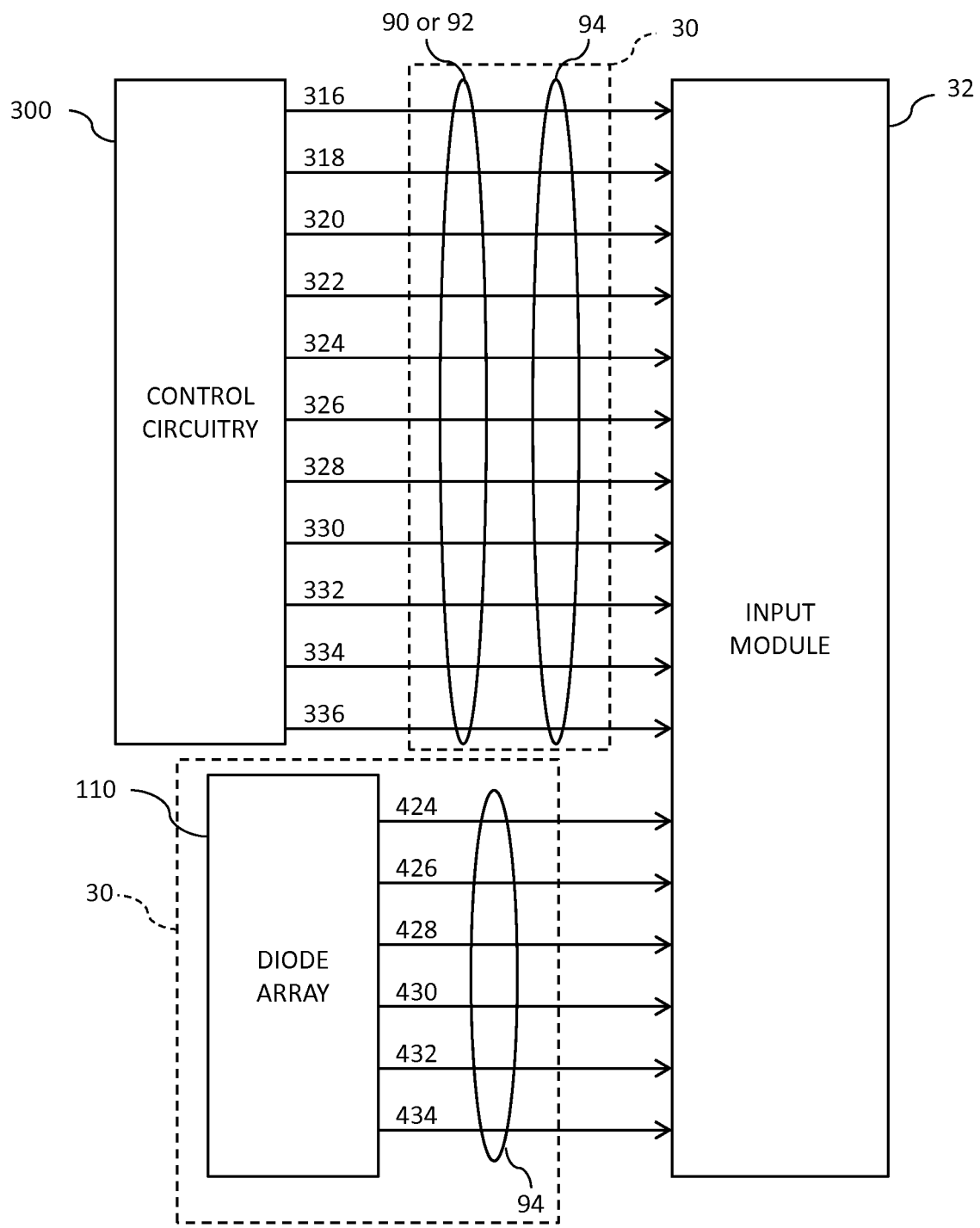
FIG. 18 is a block diagram illustrating exemplary inputs to the input module of FIG. 2 in accordance with one embodiment of the present disclosure.

A plurality of discrete lines 340, illustratively lines 316-336, configured to carry control signals are shown in FIG. 15. Discrete lines 340 are illustratively wires configured to communicate power signals, including illustrative power signals Stbd_LE_Assigned_Cx on line 316, Port_LE_Assigned_Cx on line 318, Stbd_Chg_Cx on line 320, Port_Chg_Cx on line 322, Stbd_Arm_Cx on line 324, Port_Arm_Cx on line 326, Stbd_Fire_Cx on line 328, Port_Fire_Cx on line 330, Arm_Cx on line 332, Fire_Enable_Cx on line 334, and Gun_Select_Cx on line 336. As shown in FIG. 15, the variable "x" in each of the previously identified control signals represents either a "1", which corresponds to a control signal from primary console 70, or a "2", which corresponds to a control signal from secondary console 72. Discrete lines 340 are routed between control circuitry 300 and safety interface 30 of DIO system 10. In particular, discrete lines 316 and 318 are routed from connector 90 (for control circuitry 300 of primary console 70) or connector 92 (for control circuitry 300 of secondary console 72), and discrete lines 320, 322, 324, 326, 328, 330, 332, 334, and 336 are routed to connector 90 (for control circuitry 300 of primary console 70) or connector 92 (for control circuitry 300 of secondary console 72). In the illustrated embodiment, discrete lines 340 are also routed to input module 32 for remote monitoring over communication network 29, as illustrated in FIG. 18 and described herein.

Control circuitry 300 includes paths 344, 346, 348, 341, and 343, each configured to carry a current or power signal. Path 344 links one of lines 316 and 318 to charge switch 304, arm switch 306, and line 336. Path 346 links charge switch 304 to one of lines 320 and 322 and CHG LED. Path 348 links arm switch 306 to fire enable switch 308, one of lines 324 and 326, line 332, and ARM LED. Path 341 links the fire enable switch 308 to trigger switch 314, line 334, and FIRE ENABLE LED. Path 343 links trigger switch 314 to one of lines 328 and 330.

Referring to FIG. 16, one embodiment of diode array 110 of safety interface 30 is shown. Diode array 110 comprises a plurality of diodes 440 mounted to safety interface 30 and in electrical communication with primary console 70, secondary console 72, weapon 74, weapon 80, and input module 32. Diodes 440 illustratively include diodes 400, 402, 404, 406, 408, 410, 412, 414, 416, 418, 420, and 422 arranged in a dual switching, common cathode diode arrangement. Several discrete lines are routed from diodes 440 to weapons 74 and 80, including lines 424, 430, and 432 routed to weapon 74 via connector 98 of safety interface 30 and lines 426, 428, and 434 routed to weapon 80 via connector 100 of safety interface 30. As illustrated in FIG. 16, lines 320, 322, 324, 326, 328, and 330 from control circuitry 300 of both primary console 70 and secondary console 72 are routed to diode array 110 and received by diodes 440. In particular, discrete lines 320, 322, 324, 326, 328, and 330 are routed to diode array 110 via connector 90 from control circuitry 300 of primary console 70 and via connector 92 from control circuitry 300 of secondary console 72.

As mentioned above, diode array 110 coordinates the transmission of control signals, illustratively power signals, from primary and secondary consoles 70 and 72 to weapons 74 and 80. In particular, diode 400 links Port_Chg_C1 from line 322 of primary console 70 to line 424 for receipt by weapon 74 and blocks Port_Chg_C2 from reaching line 322 of primary console 70. Diode 402 links Port_Chg_C2 from line 322 of secondary console 72 to line 424 for receipt by weapon 74 and blocks Port_Chg_C1 from reaching line 322 of secondary console 72. Diode 404 links Stbd_Chg_C1 from line 320 of primary console 70 to line 426 for receipt by weapon 80 and blocks Stbd_Chg_C2 from reaching line 320 of primary console 70. Diode 406 links Stbd_Chg_C2 from line 320 of secondary console 72 to line 426 for receipt by weapon 80 and blocks Stbd_Chg_C1 from reaching line 320 of secondary console 72. Diode 408 links Stbd_Arm_C1 from line 324 of primary console 70 to line 428 for receipt by weapon 80 and blocks Stbd_Arm_C2 from reaching line 324 of primary console 70. Diode 410 links Stbd_Arm_C2 from line 324 of secondary console 72 to line 428 for receipt by weapon 80 and blocks Stbd_Arm_C1 from reaching line 324 of secondary console 72. Diode 412 links Port_Arm_C1 from line 326 of primary console 70 to line 430 for receipt by weapon 74 and blocks Port_Arm_C2 from reaching line 326 of primary console 70. Diode 414 links Port_Arm_C2 from line 326 of secondary console 72 to line 430 for receipt by weapon 74 and blocks Port_Arm_C1 from reaching line 326 of secondary console 72. Diode 416 links Port_Fire_C1 from line 330 of primary console 70 to line 432 for receipt by weapon 74 and blocks Port_Fire_C2 from reaching line 330 of primary console 70. Diode 418 links Port_Fire_C2 from line 330 of secondary console 72 to line 432 for receipt by weapon 74 and blocks Port_Fire_C1 from reaching line 330 of secondary console 72. Diode 420 links Stbd_Fire_C1 from line 328 of primary console 70 to line 434 for receipt by weapon 80 and blocks Stbd_Fire_C2 from reaching line 328 of primary console 70. Diode 422 links Stbd_Fire_C2 from line 328 of secondary console 72 to line 434 for receipt by weapon 80 and blocks Stbd_Fire_C1 from reaching line 328 of secondary console 72.

Figure 17:
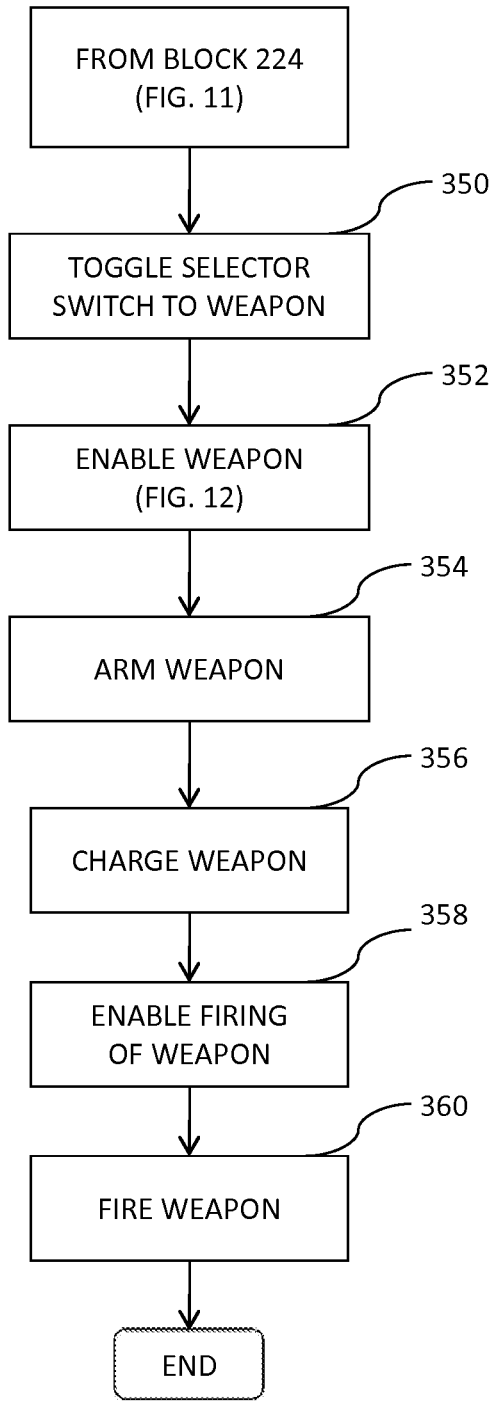
FIG. 17 is a flowchart illustrating a weapon firing sequence in accordance with one embodiment of the digital input/output system of the present disclosure.

Referring to FIG. 17, an illustrative embodiment of the operation of control circuitry 300 in a ship protection system is provided. In particular, the flowchart of FIG. 17 illustrates the firing sequence of weapon 74 and/or weapon 80 using control circuitry 300 of FIG. 13. As illustrated in FIG. 17, the control of one of weapons 74 and 80 is first enabled in block 224 of FIG. 11, as described above. Specifically, the enable signal transmitted from safety interface 30 is received by control circuitry 300 via line 316 or 318 to provide power to control circuitry 300 for controlling weapon 74 or weapon 80, respectively. For example, upon selection of device cell 156 at the local operator console 70, safety interface 30 transmits an enable signal, illustratively power signal Port_LE_Assigned_Cx, to control circuitry 300 of the local operator console 70 via line 318. Similarly, upon selection of device cell 162 at the local operator console 70, safety interface 30 transmits an enable signal, illustratively power signal Stbd_LE_Assigned_Cx, to control circuitry 300 of the local operator console 70 via line 316. Port_LE_Assigned_Cx illustratively provides 24 VDC from power supply 122, and Stbd_LE_Assigned_Cx illustratively provides 24 VDC from power supply 124. In the shown embodiment, PORT GUN SELECT LED illuminates upon receipt of Port_LE_Assigned_Cx, and STBD GUN SELECT LED illuminates upon receipt of Stbd_LE_Assigned_Cx, indicating to the operator which of weapons 74 and 80 have been selected for control at the local console 70.

As represented by block 350, selector switch 302 is toggled between a first position and a second position to link the power signal received from safety interface 30 to additional current paths of control circuitry 300. For example, if selector switch 302 is toggled to the PORT position, contacts 342 engage lines 318, 322, 326, and 330, and the power signal from line 318 is linked to path 344 in control circuitry 300. If selector switch 302 is toggled to the STBD position, contacts 342 engage lines 316, 320, 324, and 328, and the power signal from line 316 is linked to path 344 in control circuitry 300. Upon toggling selector switch 302 to the PORT or STBD position, the power signal, illustratively status signal GUN_SELECT_Cx, is transmitted via line 336 to input module 32 for remote monitoring over communication network 29. GUN_SELECT_Cx provides indication that control circuitry 300 at the local operator console 70 is powered and ready to control one of weapons 74, 80. In one embodiment, GUN_SELECT_Cx is monitored at least one of consoles 70 and 72.

Next, a selected one of weapon 74 and weapon 80 is enabled according to the embodiment shown in FIG. 12, as shown in block 352 of FIG. 17. For example, with selector switch 302 in the PORT position, device input 177 is selected at user interface 150 of the local operator console 70. As described above with reference to FIG. 12, the selection of the device input 177 energizes one of switches 114 to provide power to weapon 74. Similarly, with selector switch 302 in the STBD position, device input 179 is provided on user interface 150. As described above with reference to FIG. 12, the selection of device input 179 provides power to weapon 80. With selector switch 302 in one of the PORT and STARBOARD positions and the appropriate one of device inputs 177 and 179 selected at user interface 150, weapon 74 or weapon 80 is able to receive arm, charge, fire, and other control signals from the local operator console 70.

Next, the enabled one of weapons 74 and 80 is armed, as represented by block 354. Arm switch 306 is engaged and moved from an open position, as shown in FIG. 15, to a closed ARM position to link the power signal received from path 344 to path 348. When selector switch 302 is in the STBD position, the power signal, illustratively control signal Stbd_Arm_Cx, is transmitted from path 348 to line 324, to diode array 110, and finally to weapon 80 to arm weapon 80. When selector switch 302 is in the PORT position, the power signal, illustratively control signal Port_Arm_Cx, is transmitted from path 348 to line 326, to diode array 110, and finally to weapon 74 to arm weapon 74. In addition, ARM LED of control circuitry 300 illuminates, and a status signal Arm_Cx is transmitted via line 332 to input module 32 for remote monitoring over communication network 29. Arm_Cx provides indication that one of weapons 74 and 80 is armed. In one embodiment, indicator 180 of monitoring display 171 indicates that the enabled one of weapons 74 and 80 is armed upon the engagement of arm switch 306.

Next, the armed one of weapons 74 and 80 is charged, as represented by block 356. Charge switch 304 is engaged and moved from an open position, as shown in FIG. 15, to a closed CHARGE position to link the power signal received from path 344 to path 346. If selector switch 302 is in the STBD position, the power signal, illustratively control signal Stbd_Chg_Cx, is transmitted from path 346 to line 320, to diode array 110, and finally to weapon 80 to thereby charge weapon 80. If selector switch 302 is in the PORT position, the power signal, illustratively control signal Port_Chg_Cx, is transmitted from path 346 to line 322, to diode array 110, and finally to weapon 74 to charge weapon 74. In addition, CHG LED of control circuitry 300 illuminates. In one embodiment, indicator 182 of monitoring display 171 indicates that the armed one of weapons 74 and 80 is charged upon the engagement of charge switch 304.

Next, the charged one of weapons 74 and 80 is enabled for firing, as represented by block 358. In the illustrated embodiment, fire enable switch 308 is a safety feature configured to reduce the likelihood of inadvertently engaging trigger switch 314 and firing the weapon. At block 358, fire enable switch 308 is engaged and moved from an open position, as illustrated in FIG. 15, to a closed FIRE_ENABLE position to link the power signal from path 348 to path 341. As such, current is available at trigger switch 314, and the weapon is ready to be fired. In addition, FIRE ENABLE LED of control circuitry 300 illuminates, and a status signal Fire_Enable_Cx is transmitted via line 334 to input module 32 for remote monitoring over communication network 29. In one embodiment, indicator 184 of monitoring display 171 indicates that the charged one of weapons 74 and 80 is enabled for firing upon the engagement of fire enable switch 308.

Next, a fire command may be transmitted to the one of weapons 74 and 80 enabled for firing, as represented by block 360. To transmit a fire command, trigger switch 314 is engaged and moved from an open position, as shown in FIG. 15, to a closed FIRE position to link the power signal from path 341 to path 343. If selector switch 302 is in the STBD position, the power signal, illustratively control signal Stbd_Fire_Cx, is transmitted from path 343 to line 328, to diode array 110, and finally to weapon 80 to fire weapon 80. If selector switch 302 is in the PORT position, the power signal, illustratively control signal Port_Fire_Cx, is transmitted from path 343 to line 330, to diode array 110, and finally to weapon 74 to fire weapon 74. In one embodiment, user interface 150 of the local operator console 70 receives a status signal over communication network 29 and indicates a "Fire" status on graphical interface 168.

Referring to FIG. 18, each of lines 316-336 from control circuitry 300 are illustratively routed through safety interface 30 to input module 32 for remote monitoring over communication network 29. In particular, each of lines 316-336 from primary console 70 is routed through connectors 90 and 94 to input module 32, and each of lines 316-336 from secondary console 72 is routed through connectors 92 and 94 to input module 32. Each of lines 424-434 from diode array 110 are also routed to input module 32 via connector 94 of safety interface 30 for remote monitoring over communication network 29, as illustrated in FIG. 18. As such, the status of each command sent from the local operator console 70 in the firing sequence may be monitored from server 28.

Further, LED panel 112 of safety interface 30, shown in FIG. 5, illustratively provides status indication of the receipt of control signals from control circuitry 300 of the local operator console 70. In one embodiment, an LED illuminates upon one of primary console 70 and secondary console 72 transmitting an arm, charge, or fire command to one of weapons 74 and 80. Safety interface 30 in one embodiment utilizes eighteen LED's, each LED providing a different status indicator, although any number or combination of LED's may be used.

Figure 19:
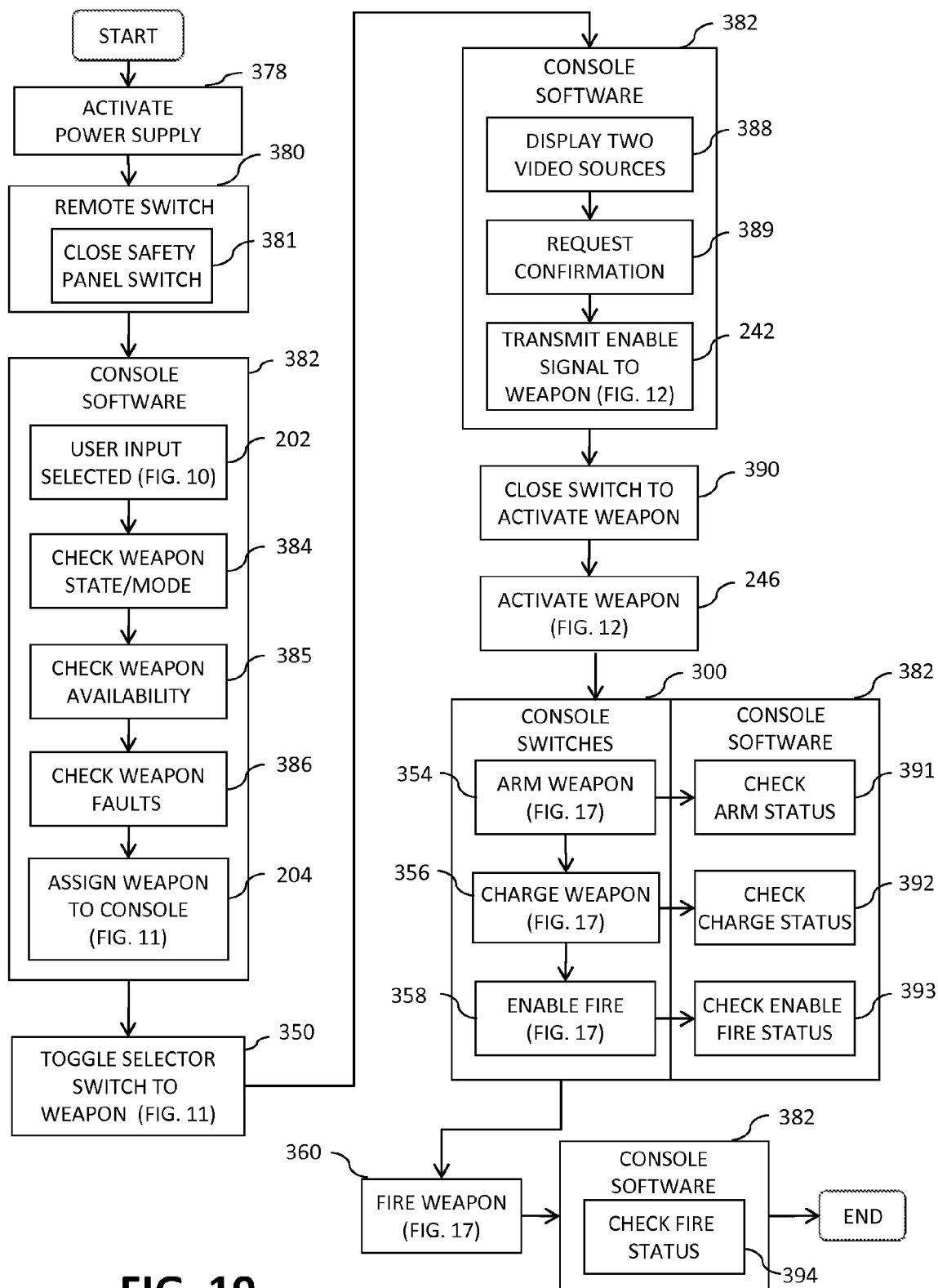
FIG. 19 is a flowchart illustrating a weapon firing sequence in accordance with one embodiment of the digital input/output system of the present disclosure.

Referring to FIG. 19, an exemplary embodiment of the firing sequence of FIG. 17 is illustrated. In particular, the flowchart of FIG. 19 illustrates the function of software 382 at the local console 70 (or remote console 72) in the firing sequence for weapon 74 and/or weapon 80. While the foregoing describes the firing sequence for controlling weapon 74, weapon 80 is similarly controlled using the firing sequence illustrated in FIG. 19.

Referring initially to block 378 of FIG. 19, the power supply for powering weapon 74, i.e., power supply 122 in FIG. 6, is activated or powered on. At block 381, a remote safety panel switch 380 is toggled to provide power from power supply 122 to a motor assembly (not shown) or other motion device located at weapon 74. Upon enablement at block 381, the motor assembly of weapon 74 is configured to receive control signals from local console 70 or remote console 72 for providing motion to weapon 74, i.e., for aiming weapon 74. The motor assembly may include several motors and gyros for providing a full range of motion to weapon 74 throughout the firing sequence. A video camera may also be mounted to weapon 74 to provide video feedback to local console 70 for assistance in aiming weapon 74. In one embodiment, switch 380 is located at power supply 122 and requires keyed access.

Upon closing switch 380, an operator may select the user input 156 (see FIG. 14) to assign control of weapon 74 to the local console 70, as illustrated in block 202 of FIG. 10. Upon selection by an operator of user input 156, software 382 at local console 70 performs several functions before assigning control of weapon 74 to the local console 70. At block 384, the state and mode of weapon 74 is checked. In one embodiment, software 382 verifies that weapon 74 is in a "ready" state and that weapon 74 is in a "tactical" mode. A driver at weapon 74 may communicate the state and mode information to local console 70 over communication network 29. At block 385, the availability of weapon 74 is checked. In particular, software 382 verifies that weapon 74 is not already assigned to remote console 72. At block 386, weapon 74 is checked for faults or other errors. If any of the checks by software 382 in blocks 384, 385, and 386 fail, local console 70 does not obtain control of weapon 74. Otherwise, the control of weapon 74 is assigned to local console 70 at block 204. In one embodiment, main computer 28 provides some or all of the information verified by software 382 at blocks 384, 385, and 386 to local console 70 via communication network 29.

At block 350, the selector switch 302 (see FIG. 15) of control circuitry 300 is toggled to the PORT position for controlling weapon 74. At block 388, two video sources are displayed on user interface 150. In particular, software 382 instructs local console 70 to request a video feed from weapon 74 and a video feed from electro-optical device (sensor) 80 (see FIG. 7) and to display both video feeds on user interface 150. At block 389, software 382 verifies that both video sources are displayed on user interface 150 by requesting confirmation from the operator. In one embodiment, a user input 170, such as device input 177 of FIG. 14, appears on the screen of user interface 150. If the operator selects the user input 170 to confirm that both video sources are displayed, software 382 instructs local console 70 to transmit an enable signal to activate weapon 74, as represented by block 242 of FIG. 19 (see also FIG. 12). As described above with reference to FIG. 12, the enable signal closes a switch (i.e. SW2) on safety interface 30 to activate weapon 74, as represented by blocks 390 and 246. In the illustrated embodiment, activating weapon 74 at block 242 enables weapon 74 to receive arm, charge, and firing commands from control circuitry 300 of local console 70. If the operator does not confirm that both video sources are displayed on user interface 150, control of weapon 74 is disabled at local console 70.

As described above with reference to FIG. 17, weapon 74 is armed at block 354, charged at block 356, and fire enabled at block 358. As illustrated in FIG. 19, software 382 contains instructions for checking the status of each arm, charge, and fire command. At block 391, software 382 checks the status of the arm command (block 354). In particular, local console 70 receives feedback from weapon 74 that weapon 74 received the arm command and that the weapon 74 is armed. If feedback from weapon 74 indicates that the arm command failed, or if the arm command was initiated out of sequence, the firing sequence is interrupted and, in one embodiment, control of weapon 74 by local console 70 is disabled. In the illustrated embodiment, weapon 74 remains armed as long as the arm switch 306 (see FIG. 15) is closed, and opening arm switch 306 interrupts the firing sequence of weapon 74.

Similarly, at block 392, software 382 checks the status of the charge command (block 356). In particular, local console 70 receives feedback from weapon 74 that weapon 74 received the charge command and that the weapon 74 is charged. If feedback from weapon 74 indicates that the charge command failed, or if the charge command was initiated out of sequence, the firing sequence is interrupted and, in one embodiment, control of weapon 74 by local console 70 is disabled. In the illustrated embodiment, weapon 74 remains charged for a predetermined time upon actuation of charge switch 304 (see FIG. 15). In particular, if weapon 74 is not fire enabled within a predetermined time after engaging charge switch 304, the firing sequence is interrupted.

Similarly, at block 393, software 382 checks the status of the fire enable command (block 358). In particular, local console 70 receives feedback from weapon 74 that weapon 74 received the fire enable command and that the weapon 74 is fire enabled. If feedback from weapon 74 indicates that the fire enable command failed, or if the fire enable command was initiated out of sequence, the firing sequence is interrupted and, in one embodiment, control of weapon 74 by local con-sole 70 is disabled. In the illustrated embodiment, weapon 74 remains fire enabled as long as the fire enable switch 308 (see FIG. 15) is closed, and opening switch 308 interrupts the firing sequence of weapon 74.

At block 360, the operator actuates trigger switch 314 (see FIG. 15) to send a fire command to weapon 74. As long as no faults occurred at weapon 74 and the fire command was received in sequence, weapon 74 fires in response to the actuation of trigger switch 314. In addition, at block 394, software 382 checks the firing status of weapon 74. In particular, local console 70 receives feedback from weapon 74 that weapon 74 received the fire command and that the weapon 74 has fired. If feedback from weapon 74 indicates that the fire command failed, or if the fire command was initiated out of sequence, the firing sequence is interrupted and, in one embodiment, control of weapon 74 by local console 70 is disabled.

In one embodiment, software 382 of local console 70 contains instructions for ensuring that weapon 74 is not being used for "friendly fire", or firing upon an unintended target, based on feedback from weapon 74. If at any point during the firing sequence it is determined that weapon 74 is engaging an unintended target, the firing sequence is interrupted and, in one embodiment, control of weapon 74 by local console 70 is disabled.

In one embodiment, all feedback communication from weapon 74 to local console 70 is transmitted over communication network 29 and managed by main computer 28. In one embodiment, feedback communication from weapon 74 is transmitted directly to local console 70 via serial communication. Local console 70 may display this feedback on user interface 150.

The word "console" as used herein is not intended to have a special meaning. Therefore, a "console" is any instrument panel, unit or system which controls and/or monitors mechanical, electrical or electronic devices as described herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A system for coordinating control of an output device by a plurality of different operators, the system comprising:
    a first control console having a first display and at least one operator operable device selection input to select at least one output device for control by the first control console and at least one device control input to control operation of at least one selected output device from the first control console;
    a second control console spaced apart from the first control console, the second control console also having a second display and at least one operator operable device selection input to select at least one output device for control by the second control console and at least one device control input to control operation of at least one selected output device from the second control console; and
    an input/output control system coupled to the first and second control consoles and to the at least one output device, the input/output control system being configured to receive signals from the device selection inputs and the device control inputs of the first and second control consoles;

wherein, in response to receipt of a device selection input signal for a selected output device from the first control console before receipt of a device selection input signal corresponding to the same selected device from the second control console, the input/output control system enables a device control input of the first control console corresponding to the selected device and disables the device selection input of the second control console corresponding to the selected device;

wherein, in response to receipt of a device selection input signal for the selected output device from the second control console before receipt of a device selection input corresponding to the same selected device from the first control console, the input/output control system enables a device control input of the second control console corresponding to the selected device and disables the device selection input of the first control console corresponding to the selected device;

wherein said first control console further comprises a first control section and said second control console further comprises a second control section, said first and second control sections are each adapted to determine that the selected output device is available for control and no faults or other conflicts have occurred in response to input of one of said device selection input signals from one of the first or second control consoles;

wherein the input/output control system includes an interface circuit coupled between the first and second control consoles and the at least one output device, said interface circuit includes a third control section configured to selectively link the first or second control consoles to the at least one selected output device, the third control section being configured to selectively block said device control signals transmitted by one of the first and second control consoles through said interface circuit such that said selected at least one output device can only receive said device control signals from one of said control consoles through said interface circuit at a time;

wherein said first control console further comprises a fourth control section and said second control console further comprises a fifth control section, said fourth and fifth control sections are each adapted to respectively couple said device control inputs of said control consoles with said interface circuit, wherein said input/output device enables one of said device control inputs of the first or second control console by providing power to one of said fourth or fifth control sections when one of said first or second control sections makes said determination that the selected output device is available for control and no faults or other conflicts have occurred.

2. The system of claim 1, wherein the input/output control system is configured to automatically send an activation signal from the input/output system to the selected output device in response to receipt of said device selection input signal for the selected output device from one of the first and second control consoles, thereby permitting control of the activated output device by one of the first and second control consoles.

3. The system of claim 1, wherein the device selection inputs of the first and second control consoles are normally enabled inputs, and wherein the device control inputs of the first and second control consoles are normally disabled inputs.

4. The system of claim 1, wherein the device selection inputs and the device control inputs of the first and second control consoles are one of a button, a switch, a virtual button on a graphical user interface, a computer mouse and a joy stick.

5. The system of claim 1, wherein the device control inputs of the first and second control consoles include a first control input to activate the selected output device from the first and second control consoles and a second control input to control operation of the activated selected output device from the first and second control consoles.

6. The system of claim 5, wherein the input/output control system is configured to automatically send an activation signal from the input/output system to the selected output device in response to receipt of a signal from a first control input, thereby permitting control of the activated output device by a corresponding second control input.

7. The system of claim 5, wherein the input/output control system is configured to receive signals from the first and second control inputs of the first and second control consoles, the input/output control system being configured to transmit signals to the selected output device to activate and control the selected output device in response to the signals from the first and second control inputs, respectively.

8. The system of claim 1, wherein, in response to receipt of a device selection input signal for a selected output device from the first control console before receipt of said device selection input signal corresponding to the same selected device from the second control console, the input/output control system enables monitoring of the selected device on the display of the first control console and disables monitoring of the selected device on the display of the second control console, and wherein, in response to receipt of a device selection input signal for the selected output device from the second control console before receipt of a device selection input corresponding to the same selected device from the first control console, the input/output control system enables monitoring of the selected device on the display of the second control console and disables monitoring of the selected device on the display of the first control console.

9. The system of claim 8, wherein said disabling of monitoring of the selected device on the display on the second console comprises replacing a first representation of said monitoring on said display with an altered representation of said first representation of said monitoring on said display.

10. The system of claim 1, wherein the third control section is a diode array configured to link the first and second control consoles to the at least one output device, the diode array being configured to block signals transmitted by one of the first and second control consoles from being received by the other of the first and second control consoles.

11. The method of claim 10, further comprising automatically activating the at least one selected output device in response to receipt of a device selection input signal to permit control of the activated output device by the one of the first or second control consoles.

12. The method of claim 10, wherein the device selection inputs of the first and second control consoles are normally enabled inputs, and wherein the device control inputs of the first and second control consoles are normally disabled inputs.

13. The method of claim 10, wherein the device selection inputs of the first and second control consoles are one of a button, a switch, a virtual button on a graphical user interface, a computer mouse and a joy stick.

14. The method of claim 10, wherein the device control inputs and the device control inputs of the first and second control consoles include a first control input to activate the selected output device from the first and second control consoles and a second control input to control operation of the activated selected output device from the first and second control consoles.

15. The method of claim 14, further comprising automatically sending an activation signal to the selected output device in response to receipt of a signal from a first control input, thereby permitting control of the activated output device by a corresponding second control input.

16. The method of claim 14, further comprising receiving signals from the first and second control inputs of the first and second control consoles; and automatically transmitting signals to the selected output device to activate and control the selected output device in response to the signals received from the first and second control inputs, respectively.

17. The system of claim 1, wherein the interface circuit, the first control console, and the second control console are coupled to a computer via a communication network, and wherein the interface circuit, the first control console, the second control console and the computer are each configured to communicate with one another via the communication network.

18. The system of claim 17, further comprising an output module coupled to the communication network and configured to receive network signals from the first and second control consoles over the communication network and to transmit corresponding signals to the third control section.

19. The system of claim 18, further comprising an input module coupled to the communication network, the input module being configured to monitor signals transmitted from the first and second control consoles to the output device and to transmit corresponding signals to the computer via the communication network to provide remote system monitoring.

20. The system of claim 19, further comprising a network module configured to provide a communication link between the communication network, the input module and the output module.

21. The system of claim 1, wherein the input/output control system includes a plurality of switches configured to transmit signals from the first and second control consoles to the at least one output device.

22. The system of claim 1, wherein the first and second control consoles are each configured to control a plurality of different output devices, the input/output control system providing communication between the first and second control consoles and the plurality of output devices.

23. The system of claim 1, wherein said graphical user interface is configured to display data received from a selected output device, the least one device selection input and the at least one device control input being provided on the graphical user interface of the first and second control consoles.

24. The system of claim 1, wherein the at least one output device is one of a sensor, a light, and a lethal effector.

25. A system as in claim 1, wherein said first control console is adapted to have a plurality of device selection and device control inputs adapted to control operation of a plurality of output devices comprising said selected output device and an unselected output device.

26. A system as in claim 25, wherein said input/output device comprise a plurality of electrical switches adapted to physically decouple an electrical circuit from said control consoles from said plurality of output devices until said input/output device has power applied to it.

27. A system for coordinating control of an output device by a plurality of different operators, the system comprising:
 a first control console having at least one device selection input to select at least one output device for control by the first control console and at least one device control input to control operation of at least one selected output device from the first control console;
 a second control console spaced apart from the first control console, the second control console also having at least one device selection input to select at least one output device for control by the second control console and at least one device control input to control operation of at least one selected output device from the second control console;
 means coupled to the first and second control consoles and to the at least one output device for receiving signals from the device selection inputs and the device control inputs of the first and second control consoles;
 means for enabling a device control input of the first control console corresponding to the selected device and for disabling the device selection input of the second control console corresponding to the selected device in response to receipt of a device selection input signal for a selected output device from the first control console before receipt of a device selection input signal corresponding to the same selected device from the second control console; and
 means for enabling a device control input of the second control console corresponding to the selected device and for disabling the device selection input of the first control console corresponding to the selected device in response to receipt of a device selection input signal for the selected output device from the second control console before receipt of a device selection input corresponding to the same selected device from the first control console;
 wherein said first and second control console each respectively comprise first and second control sections, said first and second control sections are adapted to communicate with each other, said first and second control sections are adapted to determine if said selected device is available for control and determine if a predetermined condition exists comprising a fault or conflict condition prior to said device selection input signal being sent by one of said first and second control consoles.

28. The system of claim 27, wherein the first and second control consoles each include a display to enable user control of said at least one output device and permit a user to monitor operation of the at least one output device, and further comprising:
 means for enabling monitoring of a selected device on the display of the first control console and for disabling monitoring of the selected device on the display of the second control console in response to receipt of a device selection input signal for a selected output device from the first control console before receipt of a device selection input signal corresponding to the same selected device from the second control console; and
 means for enabling monitoring of the selected device on the display of the second control console and for disabling monitoring of the selected device on the display of the first control console in response to receipt of a device selection input signal for the selected output device from the second control console before receipt of a device selection input corresponding to the same selected device from the first control console.

* * * * *